(12) United States Patent
Andrada et al.

(10) Patent No.: US 9,578,507 B2
(45) Date of Patent: *Feb. 21, 2017

(54) MANAGING HIDDEN SECURITY FEATURES IN USER EQUIPMENT

(71) Applicants: Verizon Patent and Licensing Inc., Basking Ridge, NJ (US); Cellco Partnership, Basking Ridge, NJ (US)

(72) Inventors: Mauricio Pati Caldeira de Andrada, South Plainfield, NJ (US); Muhammad Salman Nomani, Somerset, NJ (US); Howard G. Hammer, Wayne, NJ (US); Shweta Sinha, Tampa, FL (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,852

(22) Filed: Nov. 3, 2015

(65) Prior Publication Data
US 2016/0057625 A1 Feb. 25, 2016

Related U.S. Application Data

(63) Continuation of application No. 14/057,970, filed on Oct. 18, 2013, now Pat. No. 9,271,149.

(51) Int. Cl.
*H04W 12/06* (2009.01)
*H04W 4/10* (2009.01)
(Continued)

(52) U.S. Cl.
CPC .......... *H04W 12/06* (2013.01); *H04L 65/1016* (2013.01); *H04M 7/0078* (2013.01);
(Continued)

(58) Field of Classification Search
CPC ...................................................... H04W 12/06
See application file for complete search history.

(56) References Cited

U.S. PATENT DOCUMENTS 6,763,226 B1 * 7/2004 McZeal, Jr. ........ H04B 7/18595
370/354
7,738,900 B1 * 6/2010 Manroa ............... H04L 12/1881
455/3.01

(Continued)

OTHER PUBLICATIONS

"Google Play Services," Android Developers,developer.android.com/google/playservices/index.html, two pages, Dec. 3, 2012.

*Primary Examiner* — Parth Patel

(57) ABSTRACT

A device determines whether a PTT application is authenticated to access a first API and a second API, and prevents the PTT application from accessing the first and second APIs when the PTT application is not authenticated. The device permits the PTT application to access the first and second APIs when the PTT application is authenticated, and modifies, via the first API, a timer that dictates when the device checks for traffic received from a network. The device establishes, via the second API, a data connection with the network, and determines, based on the data connection, a QoS framework for the network. The device utilizes the PTT application and the timer to establish a PTT session with another device via the network, and prioritizes, based on the QoS framework, PTT traffic provided in the PTT session with the other device.

20 Claims, 16 Drawing Sheets

700 ⟶

(51) Int. Cl.
*H04W 52/02* (2009.01)
*H04W 28/02* (2009.01)
*H04M 7/00* (2006.01)
*H04L 29/06* (2006.01)
*H04W 88/06* (2009.01)

(52) U.S. Cl.
CPC ......... *H04W 4/10* (2013.01); *H04W 28/0215* (2013.01); *H04W 28/0268* (2013.01); *H04W 52/0264* (2013.01); *H04W 88/06* (2013.01)

(56) References Cited

U.S. PATENT DOCUMENTS

| | | | | |
|---|---|---|---|---|
| 7,818,020 B1* | 10/2010 | Manroa | H04L 29/1216 | 455/3.01 |
| 7,899,444 B2* | 3/2011 | Hans | H04L 12/1822 | 370/260 |
| 8,155,696 B2* | 4/2012 | Swanburg | H04M 1/72522 | 455/405 |
| 8,194,646 B2* | 6/2012 | Elliott | H04L 12/14 | 370/230 |
| 8,447,341 B2* | 5/2013 | Denman | H04W 4/10 | 455/515 |
| 8,699,678 B2* | 4/2014 | Katis | H04L 51/04 | 370/352 |
| 8,718,254 B2* | 5/2014 | Yasrebi | H04M 3/56 | 370/352 |
| 9,088,440 B2* | 7/2015 | Cai | H04L 12/6418 | |
| 2004/0100940 A1* | 5/2004 | Kuure | H04W 68/02 | 370/349 |
| 2004/0103278 A1* | 5/2004 | Abhishek | H04L 63/08 | 713/160 |
| 2004/0214563 A1* | 10/2004 | Hsu | H04B 1/46 | 455/421 |
| 2005/0009535 A1* | 1/2005 | Cherian | H04W 84/08 | 455/455 |
| 2005/0202807 A1* | 9/2005 | Ayyasamy | H04W 4/10 | 455/418 |
| 2005/0250523 A1* | 11/2005 | Lemke | H04L 65/4061 | 455/509 |
| 2006/0222009 A1* | 10/2006 | Yao | H04W 92/06 | 370/469 |
| 2007/0004517 A1* | 1/2007 | Mahajan | A63F 13/12 | 463/42 |
| 2007/0021132 A1* | 1/2007 | Jin | H04W 4/10 | 455/518 |
| 2007/0077919 A1* | 4/2007 | Chiarulli | H04W 4/10 | 455/414.1 |
| 2007/0091836 A1* | 4/2007 | Oprescu-Surcobe | H04W 52/0225 | 370/318 |
| 2007/0094409 A1* | 4/2007 | Crockett | H04L 29/06 | 709/233 |
| 2007/0105589 A1* | 5/2007 | Lu | H04W 88/02 | 455/556.2 |
| 2007/0121596 A1* | 5/2007 | Kurapati | H04L 29/06027 | 370/356 |
| 2007/0195735 A1* | 8/2007 | Rosen | H04W 76/005 | 370/335 |
| 2007/0254631 A1* | 11/2007 | Spooner | G06F 21/6218 | 455/411 |
| 2007/0259673 A1* | 11/2007 | Willars | H04W 52/0225 | 455/453 |
| 2007/0270097 A1* | 11/2007 | Namm | H04B 7/2606 | 455/11.1 |
| 2008/0057960 A1* | 3/2008 | Lahtiranta | H04M 1/72583 | 455/435.2 |
| 2008/0104572 A1* | 5/2008 | Hernandez | G06F 21/53 | 717/114 |
| 2008/0151828 A1* | 6/2008 | Bjorken | H04W 72/044 | 370/329 |
| 2008/0189421 A1* | 8/2008 | Langen | H04L 29/06 | 709/227 |
| 2008/0220765 A1* | 9/2008 | Chu | H04L 65/4061 | 455/422.1 |
| 2008/0318610 A1* | 12/2008 | Bhaskaran | H04L 65/403 | 455/518 |
| 2009/0210536 A1* | 8/2009 | Allen | H04M 3/58 | 709/227 |
| 2009/0219205 A1* | 9/2009 | Jazra | G04G 5/002 | 342/357.64 |
| 2009/0280850 A1* | 11/2009 | Mathur | G06F 9/54 | 455/518 |
| 2010/0036921 A1* | 2/2010 | Ananthanarayanan | H04W 52/02 | 709/206 |
| 2010/0195503 A1* | 8/2010 | Raleigh | H04W 28/0268 | 370/235 |
| 2010/0235823 A1* | 9/2010 | Garbers | G06F 9/44536 | 717/170 |
| 2011/0021202 A1* | 1/2011 | Rosen | H04W 72/087 | 455/450 |
| 2011/0122783 A1* | 5/2011 | Lin | H04W 76/046 | 370/252 |
| 2011/0122784 A1* | 5/2011 | Ananthanarayanan | H04W 4/10 | 370/252 |
| 2011/0170408 A1* | 7/2011 | Furbeck | H04L 47/10 | 370/230 |
| 2011/0211439 A1* | 9/2011 | Manpuria | H04W 72/005 | 370/216 |
| 2011/0305188 A1* | 12/2011 | Bouwers | H04W 4/10 | 370/315 |
| 2012/0054847 A1* | 3/2012 | Schultz | G06F 21/33 | 726/9 |
| 2012/0093145 A1* | 4/2012 | Anchan | H04W 28/24 | 370/352 |
| 2012/0099564 A1* | 4/2012 | Bekiares | H04L 47/2441 | 370/336 |
| 2012/0134352 A1* | 5/2012 | Vu | H04L 61/2053 | 370/347 |
| 2013/0109426 A1* | 5/2013 | Kerger | H04L 65/4061 | 455/518 |
| 2013/0172023 A1* | 7/2013 | Chan | H04W 4/14 | 455/466 |
| 2013/0231049 A1* | 9/2013 | Sharma | G06F 1/1632 | 455/41.2 |
| 2013/0231100 A1* | 9/2013 | Sharma | H04W 4/10 | 455/418 |
| 2013/0329550 A1* | 12/2013 | Kotecha | H04W 76/025 | 370/230 |
| 2014/0064071 A1* | 3/2014 | Paladugu | H04W 28/24 | 370/230 |
| 2014/0064084 A1* | 3/2014 | Paladugu | H04W 28/10 | 370/235 |
| 2014/0064124 A1* | 3/2014 | Paladugu | H04W 76/028 | 370/252 |
| 2014/0064209 A1* | 3/2014 | Anchan | H04W 72/0406 | 370/329 |
| 2014/0066084 A1* | 3/2014 | Paladugu | H04W 28/24 | 455/452.2 |
| 2014/0095692 A1* | 4/2014 | Anderson | H04L 67/22 | 709/224 |
| 2014/0215036 A1* | 7/2014 | Elzur | H04L 49/50 | 709/223 |
| 2014/0221023 A1* | 8/2014 | Maggenti | H04W 68/02 | 455/458 |
| 2014/0221034 A1* | 8/2014 | Renko | H04W 76/005 | 455/518 |
| 2014/0258367 A1* | 9/2014 | Suryavanshi | H04L 65/1073 | 709/203 |
| 2014/0258368 A1* | 9/2014 | Suryavanshi | H04L 29/06047 | 709/203 |
| 2014/0274065 A1* | 9/2014 | Low | H04W 36/0022 | 455/437 |
| 2015/0078295 A1* | 3/2015 | Mandyam | H04L 65/1003 | 370/329 |
| 2015/0109908 A1* | 4/2015 | Andrada | H04W 12/06 | 370/230 |

(56) References Cited

U.S. PATENT DOCUMENTS

| | | | | |
|---|---|---|---|---|
| 2015/0110005 A1* | 4/2015 | Hammer | ................ | H04W 4/10 370/329 |
| 2015/0131657 A1* | 5/2015 | Oyman | ................ | H04W 56/00 370/390 |
| 2016/0119762 A1* | 4/2016 | Zhu | ..................... | H04W 4/10 370/312 |

* cited by examiner

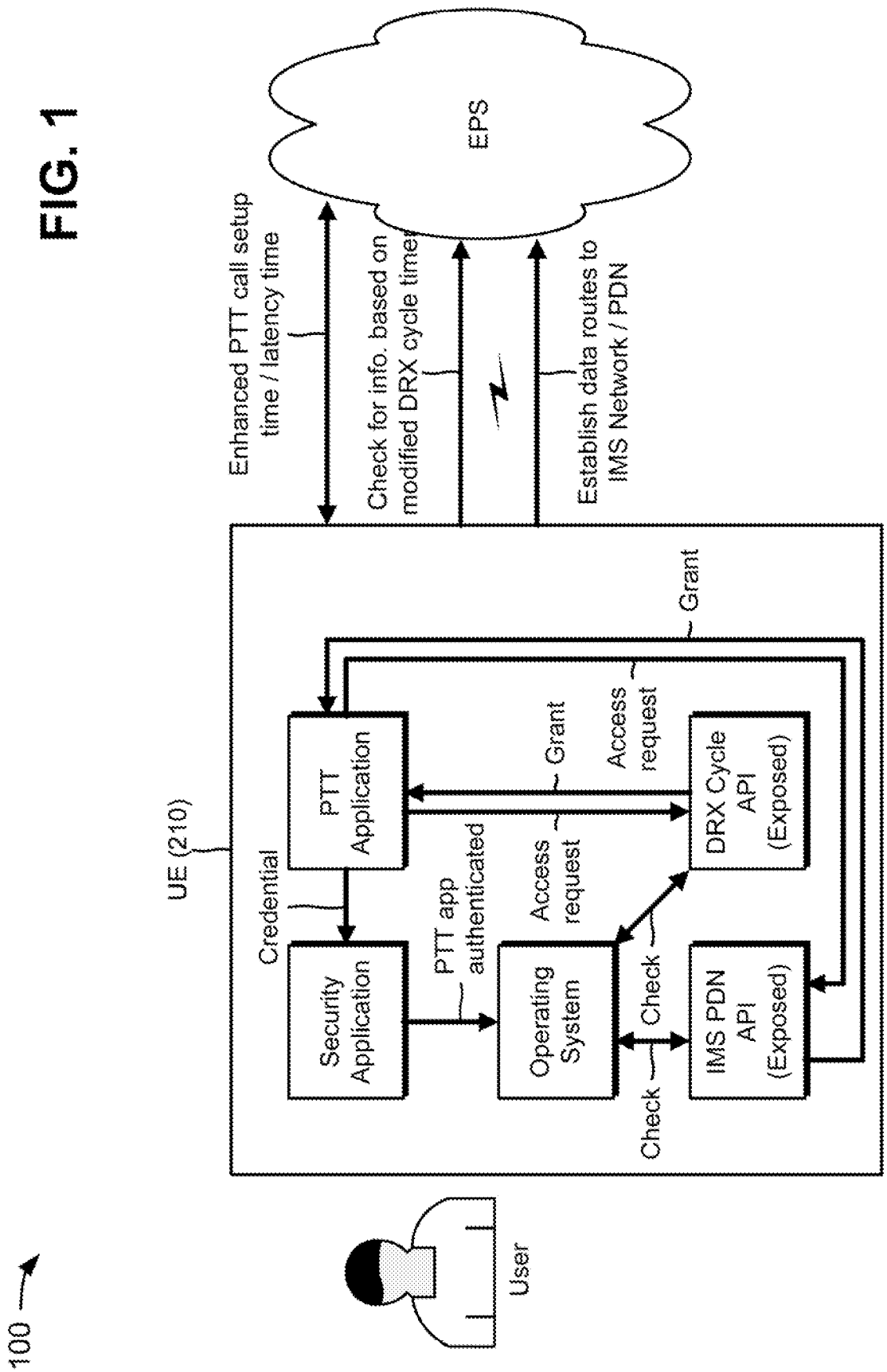

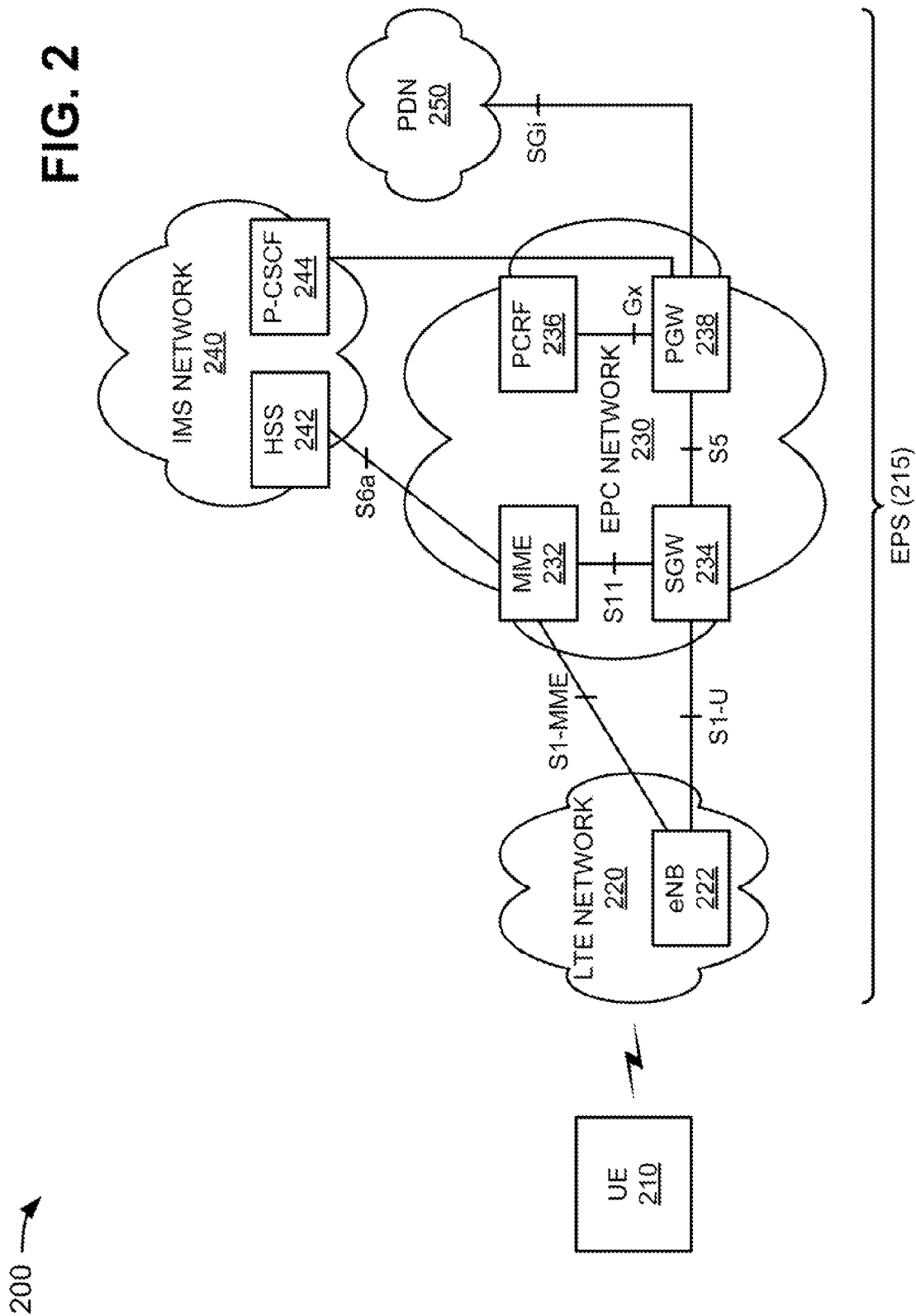

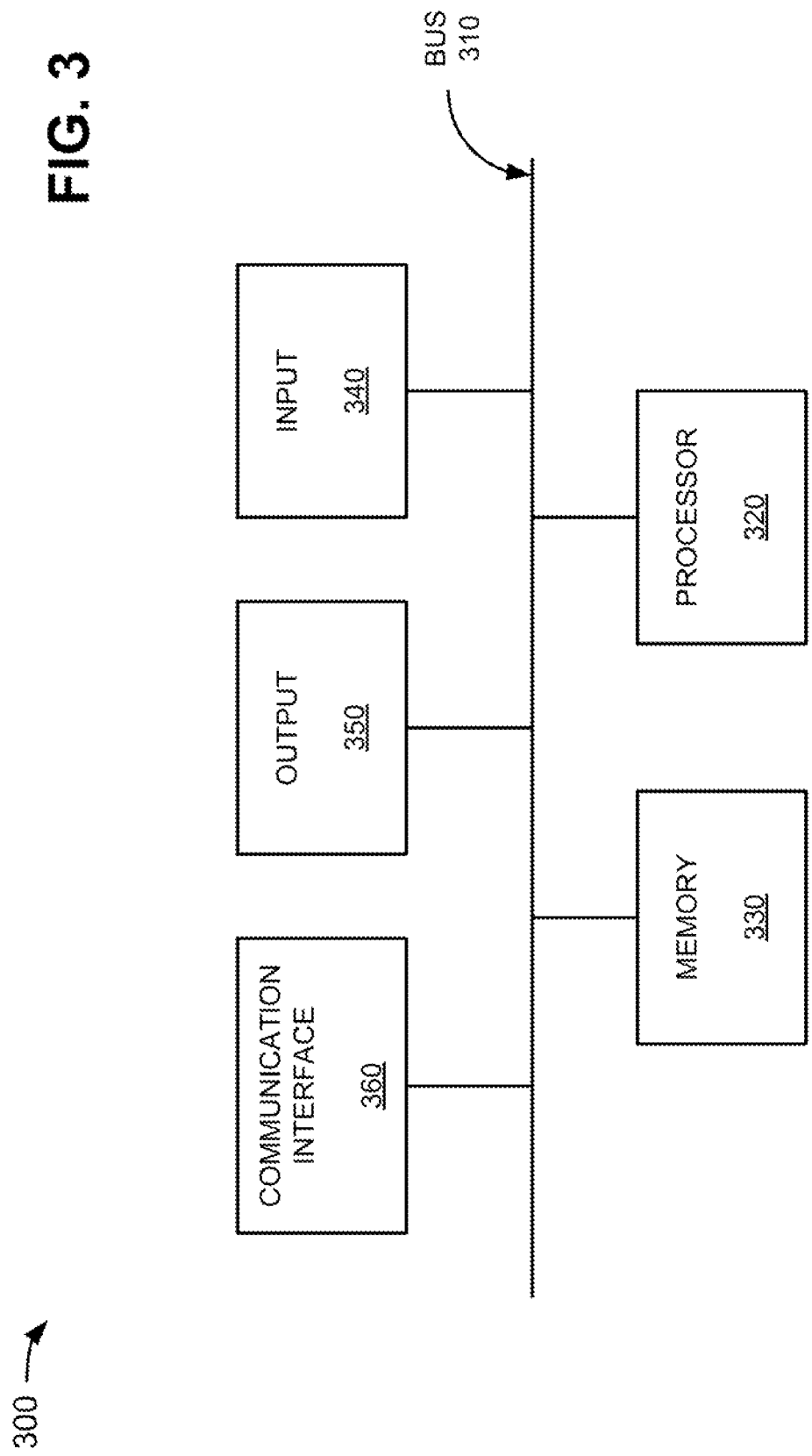

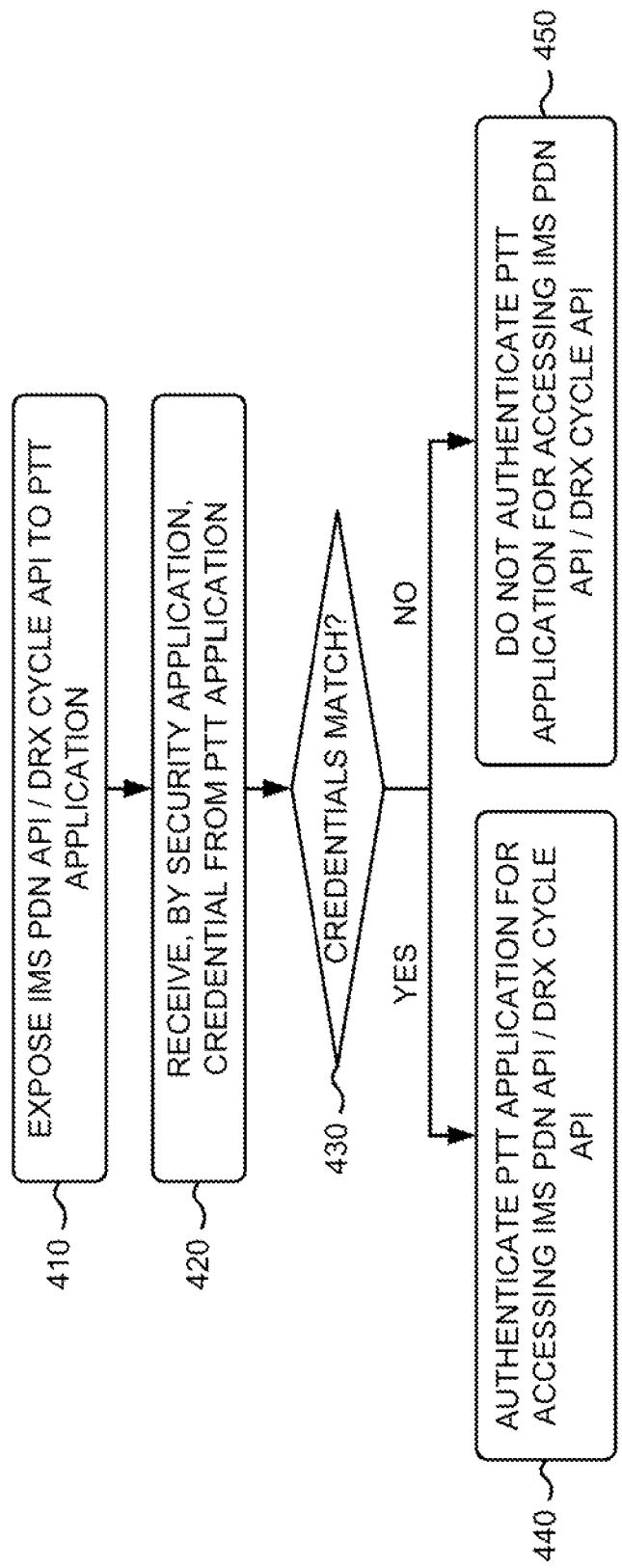

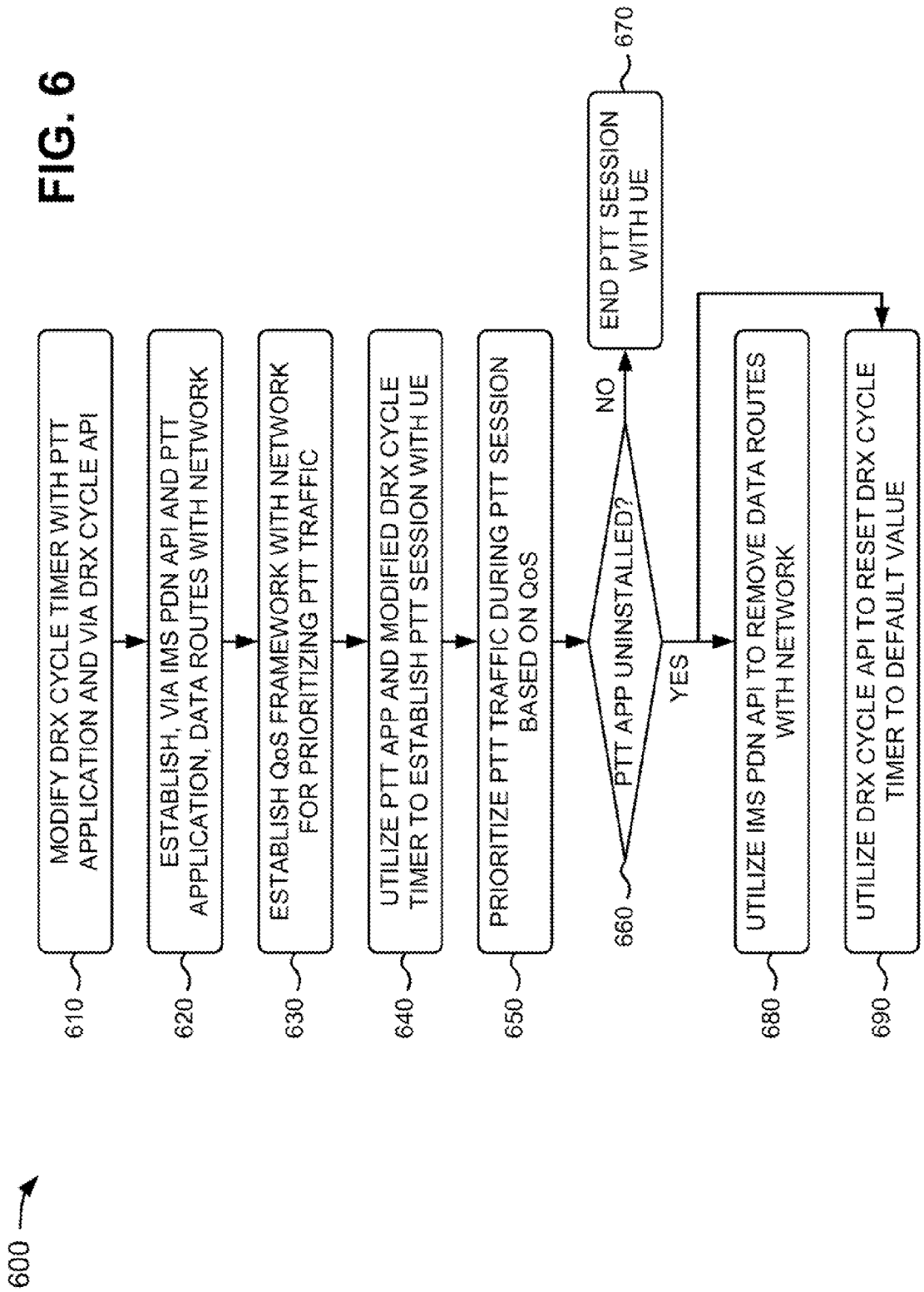

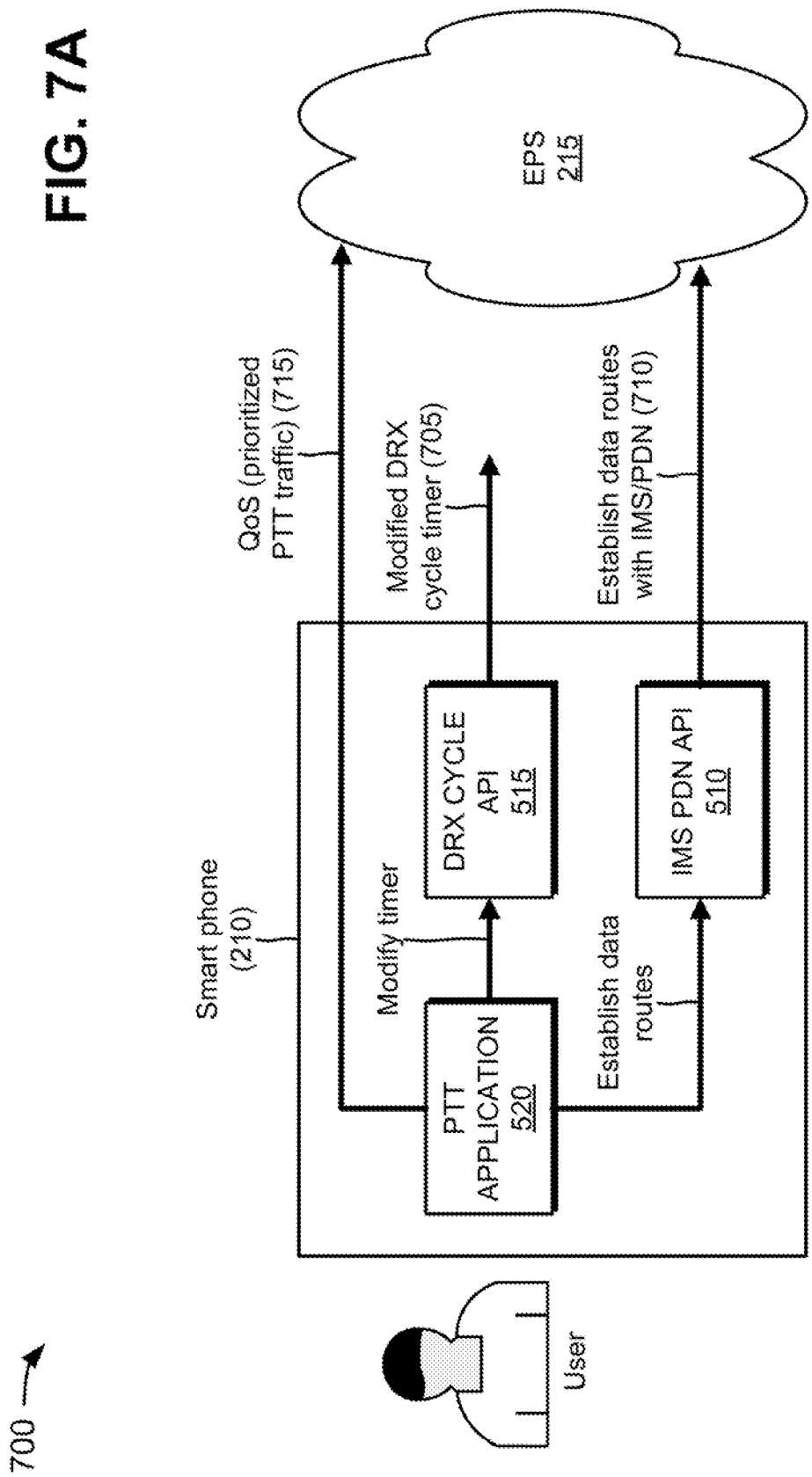

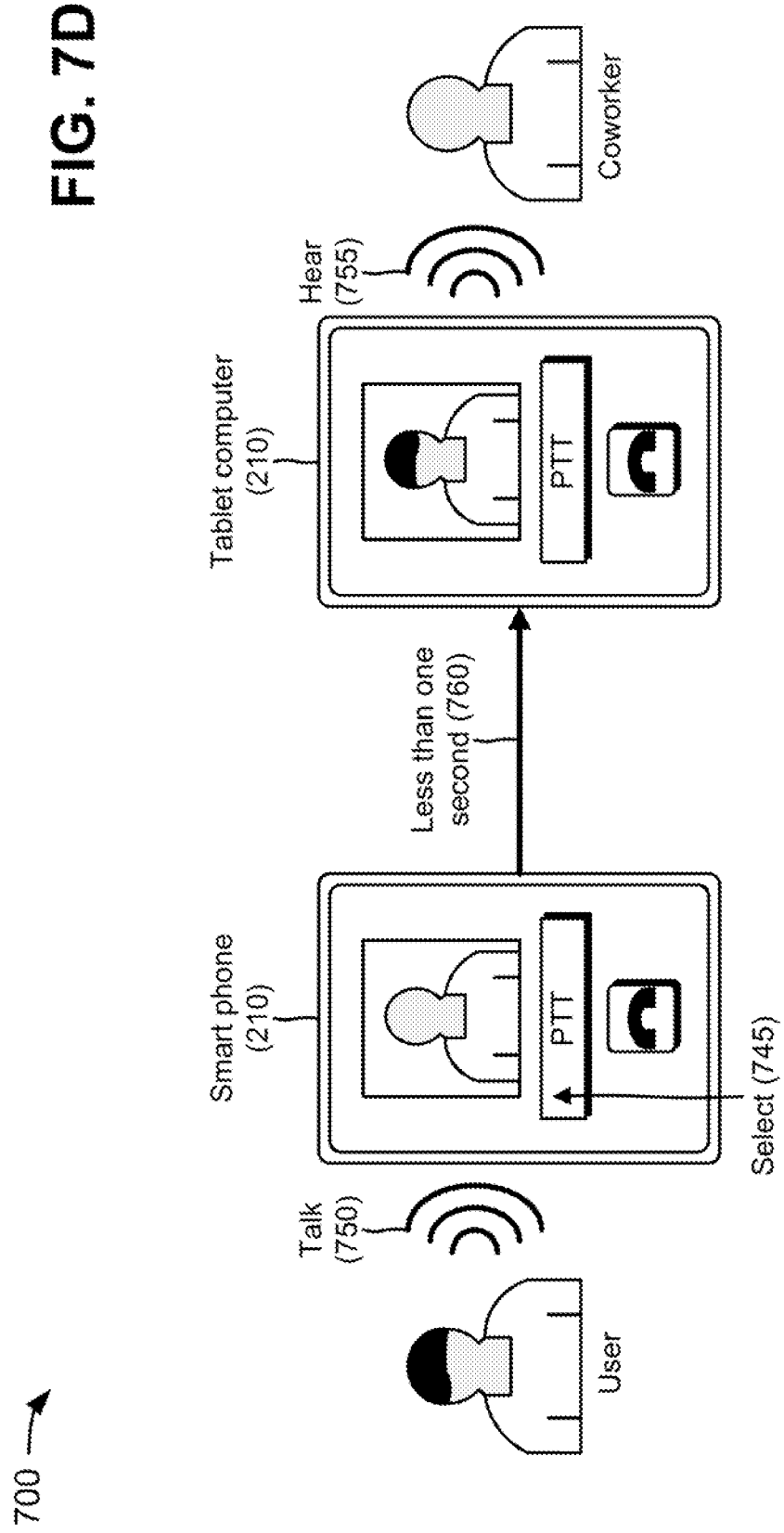

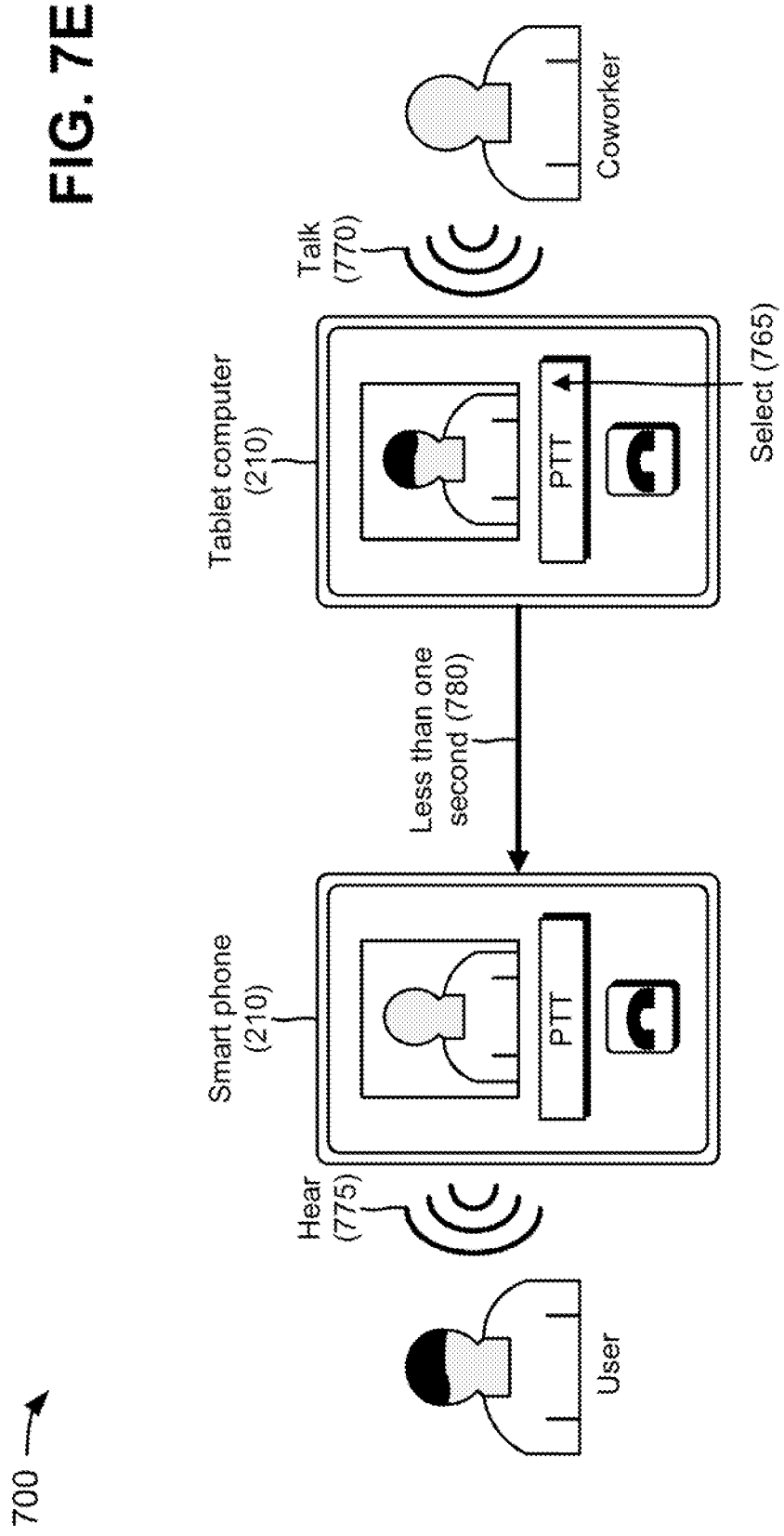

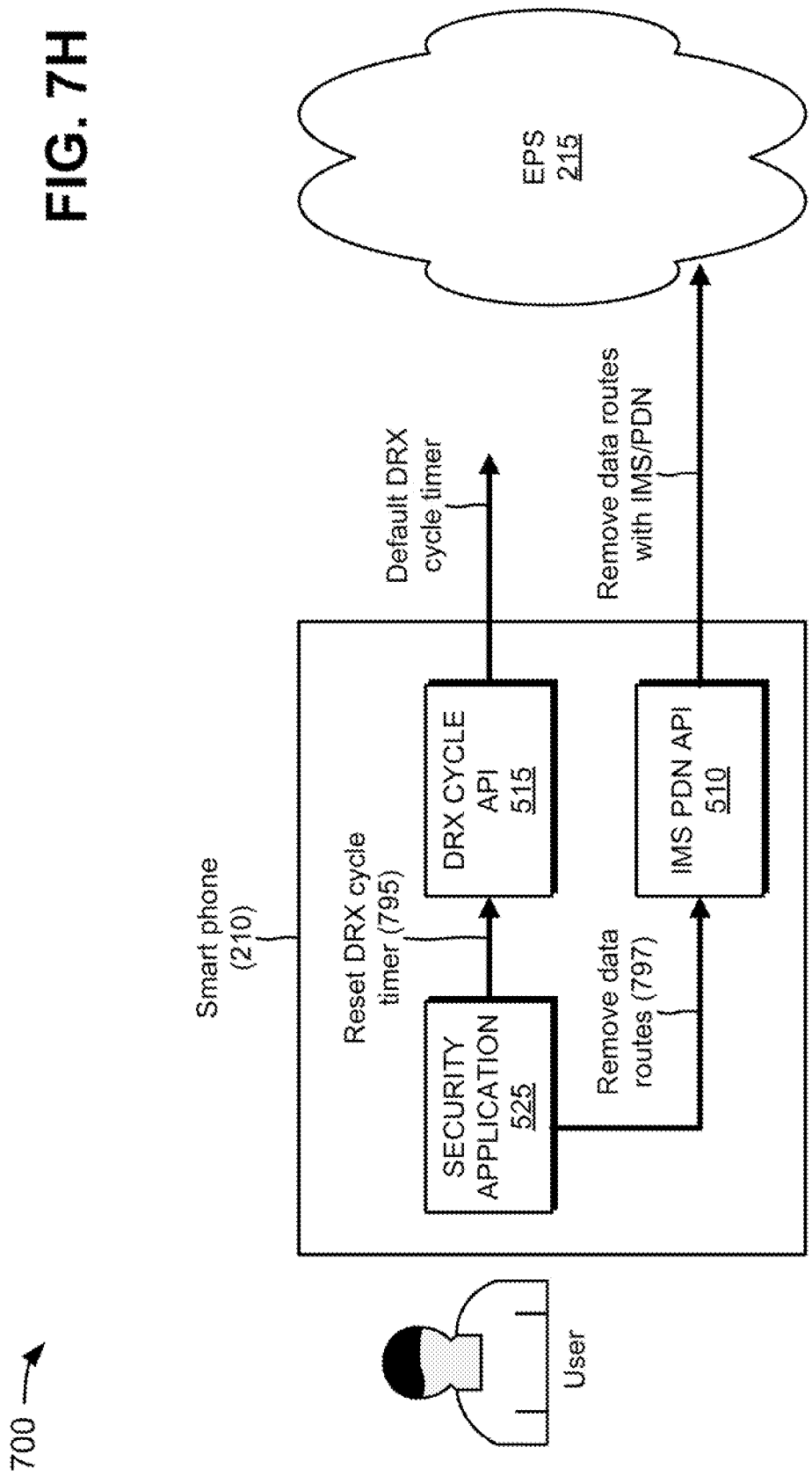

MANAGING HIDDEN SECURITY FEATURES IN USER EQUIPMENT

CROSS REFERENCE TO RELATED APPLICATIONS

This application claims priority under 35 U.S.C. sec. 120 to, and is a continuation of, U.S. patent application Ser. No. 14/057,970 entitled "Managing hidden security features in user equipment", which has a filing date of Oct. 18, 2013, and which this application incorporates by reference in its entirety.

BACKGROUND

A push-to-talk (PTT) service provides direct one-to-one and/or one-to-many audio communication. PTT may include a mechanism that provides instantaneous communication between parties, and that utilizes a button to switch user equipment (UE) from a voice transmission mode to a voice reception mode. The operation of UEs in this manner may be similar to how walkie talkies operate. A PTT service may switch a UE from a full duplex mode, where both parties may hear each other simultaneously, to a half duplex mode, where a single party may speak at one time. Multiple parties to a conversation may also be included. Availabilities of parties may be checked before a call with the help of a presence function.

In the Third Generation Partnership Project (3GPP), the fourth generation (4G) cellular network includes an evolved packet system (EPS). The EPS may include a radio access network (e referred to as long term evolution (LTE) network), a wireless core network (e.g., referred to as an evolved packet core (EPC) network), an Internet protocol (IP) multimedia subsystem (IMS) network, and a packet data network (PDN). The LTE network is often called an evolved universal terrestrial radio access network (E-UTRAN). The EPC network is an all-IP packet-switched core network that supports high-speed wireless and wireline broadband access technologies. The EPC network allows UEs to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

BRIEF DESCRIPTION OF THE DRAWINGS

FIG. 1 is a diagram of an overview of an example implementation described herein;

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for granting or denying access to exposed application programming interfaces (APIs);

FIG. 6 is a flow chart of an example process for establishing and conducting a PTT session with another UE based on exposed APIs; and FIGS. 7A-7H are diagrams of an example relating to the example process shown in FIG. 6.

DETAILED DESCRIPTION OF PREFERRED EMBODIMENTS

Figure 5A:
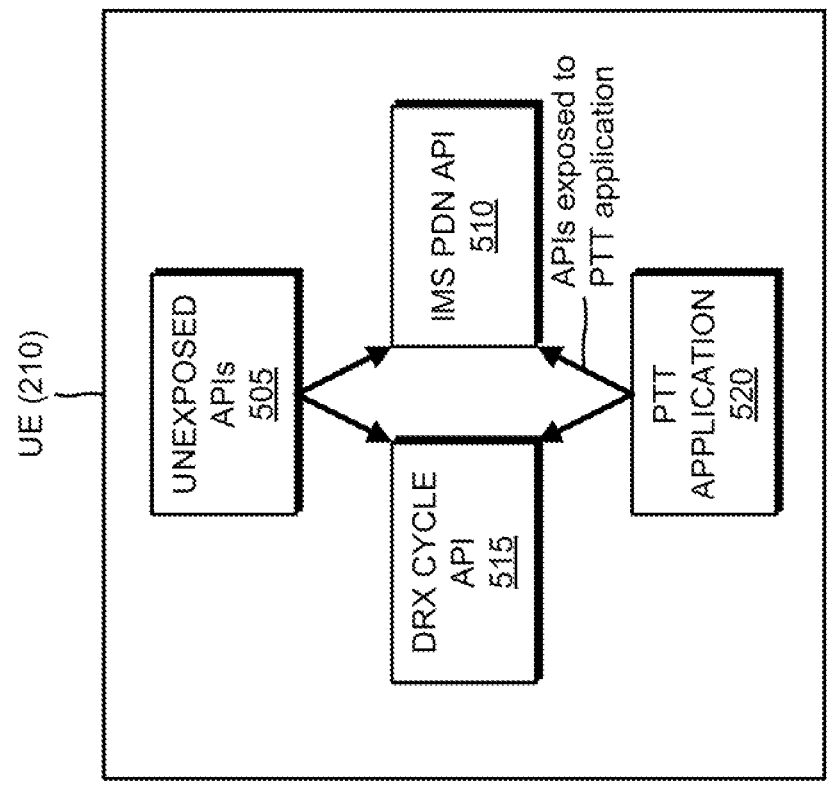
FIGS. 5A-5C are diagrams of an example relating to the example process shown in FIG. 4.

The following detailed description refers to the accompanying drawings. The same reference numbers in different drawings may identify the same or similar elements.

Current 4G PTT applications use a public Internet connection with no quality of service (QoS) for PTT services. Without QoS, a user's PTT experience may degrade when a network or a UE is busy and PTT traffic is queued up behind other traffic (e.g., email, video, Internet, etc. traffic). The user experience may be exemplified in what is called a "push to hear" delay, which measures how quickly a user hears a beep after pushing the PTT button and how quickly the user's voice reaches a called party. Current 4G PTT applications have push to hear delays of approximately 1.5 to 2 seconds, which creates a poor user experience.

FIG. 1 is a diagram of an overview of an example implementation 100 described herein. As shown, a user may be associated with a UE, connected to an EPS that includes a RAN, an EPC network, an IMS network, and a PDN. The UE may include a PTT application that enables the user to establish and conduct a PTT call (or session) via the EPS. In order to enhance the PTT application to improve the PTT session, a manufacturer of the UE may expose one or more hidden or unexposed APIs. For example, the UE manufacturer may expose an IMS PDN API and a Discontinuous Receive (DRX) cycle API, as shown in FIG. 1. The IMS PDN API may enable the UE to establish data routes to the IMS network and the PDN. The DRX cycle API may enable the UE to modify a DRX cycle timer that dictates when the UE checks a network for traffic.

However, since the exposed APIs may affect battery life of the UE and may be susceptible to security threats, the UE may include a security application that restricts access to the exposed APIs, as further shown in FIG. 1. The security application may provide secure access to the IMS PDN API and the DRX cycle API by the PTT application, and may prevent unauthorized applications from accessing the IMS PDN API and the DRX cycle API.

For example, the security application ma include authentication credentials (e.g., a signature, a security token, a security key, or the like) that may be utilized to authenticate applications attempting to access the IMS PDN API and/or the DRX cycle API. The security application may request that a particular application attempting to access the IMS PDN API and/or the DRX cycle API provide a credential. If the credential provided by the particular application matches the credential of the security application, the security application may authenticate the particular application for accessing the IMS PDN API and/or the DRX cycle API. When the PTT application is installed in the UE, the PTT application may be provided with a credential that matches the credential of the security application. Therefore, the security application may authenticate the PTT application for accessing the IMS PDN API and/or the DRX cycle API, as shown in FIG. 1. The security application may provide, to an operating system of the UE, a message indicating that the PTT application is authenticated for accessing the IMS PDN API and/or the DRX cycle API.

As further shown in FIG. 1, the PTT application may request access to the IMS PDN API, and the IMS PDN API may check with the operating system to determine whether the PTT application is authenticated. Since the PTT application is authenticated, the IMS PDN API may grant the PTT application access to the IMS PDN API. The PTT may utilize the IMS PDN API to establish a data connection (e.g., set up data routes) with the PDN over the IMS network. Unlike the public Internet, the IMS network may permit the UE to utilize quality of service (QoS) with respect to PTT sessions. In some implementations, the QoS may include prioritizing PTT traffic over other types of traffic, such as, for example, email, video, and Internet traffic. The QoS may improve a call setup time for establishing a PTT session, and may improve a latency time associated with the PTT session.

As further shown in FIG. 1, the PTT application may request access to the DRX cycle API, and the DRX cycle API may check with the operating system to determine whether the PTT application is authenticated. Since the PTT application is authenticated, the DRX cycle API may grant the PTT application access to the DRX cycle API. The PTT application may access the DRX cycle API in order to modify the DRX cycle timer provided in the DRX cycle API. In some implementations, the PTT application may decrease the DRX cycle tinier so that the UE checks the EPS for traffic (e.g., PTT traffic) more frequently. This may enable the UE to more quickly receive PTT traffic from the EPS, such as an incoming PTT call, which ma result in shorter call setup times (e.g., relative to public Internet-based PTT).

Such PTT enhancements may permit prioritization of PTT traffic over other types of traffic, such as email, video, Internet, etc. traffic. This may provide improved PTT call setup time and/or latency time over current 4G PTT implementations, which may improve the PTT user experience. For example, the PTT enhancements may provide push to hear delays of approximately less than one second.

Implementations of the security application are described herein with respect to a PTT application and to particular APIs exposed for the purpose of enhancing the PTT application. However, the security application may be utilized to provide secure access to one or more exposed APIs of the UE, other than the particular exposed APIs described herein (e.g., the MS PDN API and the DRX cycle API). For example, the security application may be utilized to grant or deny the PTT application, and/or one or more other applications of the UE, access to any exposed API of the UE. Furthermore, although the PTT application is described herein in terms of PTT voice calls, the PTT application may alternatively or additionally be utilized for PTT video calls.

FIG. 2 is a diagram of an example environment 200 in which systems and/or methods described herein may be implemented. As illustrated, environment 200 may include a UE 210 and an EPS 215 that includes a LTE network 220, an EPC network 230, an IMS network 240, and a PDN 250. LTE network 220 may include an eNodeB (eNB) 222. EPC network 230 may include a mobility management entity (MME) 232, a serving gateway (SGW) 234, a policy and charging rules function (PCRF) 236, and a PDN gateway (PGW) 238. IMS network 240 may include a home subscriber server (HSS) 242 and a proxy call session control function (P-CSCF) 244. Devices/networks of environment 200 may connect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface, and may connect with HSS 242 over a S6a interface. SGW 234 may connect with PGW 238 over a S5 interface. PCRF 236 may connect with PGW 238 over a Gx interface PGW 238 may connect with PDN 250 over a SGi interface, and may connect with P-CSCF 244. Other connections, not shown in FIG. 2, may also be utilized by EPS 215. For example, multiple MMEs 232 may connect with one another over S10 interfaces.

UE 210 may include a device that is capable of communicating over LTE network 220, EPC network 230, and/or IMS network 240. In some implementations, UE 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; or another type of computation and communication device.

EPS 215 may include is a core network architecture of the 3GPP LTE wireless communication standard. EPS 215 may include LTE network 220, EPC network 230. IMS network 240, and PDN 250.

LTE network 220 may include a communications network that connects users (e.g., UE 210) to a service provider network. In some implementations, LTE network 220 may include a wireless local area network (WLAN) or another type of access network (e.g., an E-UTRAN or an eHRPD network). In some implementations, LTE network 220 may include a radio access network capable of providing a particular data rate, a particular latency, packet optimization, a particular capacity and coverage, etc.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include an IP packet-switched core network that supports high-speed wireless and wireline broadband access technologies. In some implementations, EPC network 230 may provide packet-switched voice services (e.g., which are traditionally circuit-switched) using IMS network 240 and PDN 250.

MME 232 may include one or more computation and communication devices that may be responsible for idle mode tracking and paging procedures (e.g., including retransmissions for UE 210, MME 232 may be involved in a bearer activation/deactivation process (e.g., for UE 210) and may choose a SGW for UE 210 at an initial attach and at a time of intra-LTE handover. In some implementations, MME 232 may authenticate UE 210. Non-access stratum (NAS) signaling may terminate at MME 232, and MME 232 may generate and allocate temporary identities to UEs 210. MME 232 may check authorization of UE 210 to utilize LTE network 220 and may enforce roaming restrictions for UE 210. MME 232 may be a termination point in EPC network 230 for ciphering/integrity protection for NAS signaling and may handle security key management. MME 232 may provide a control plane function for mobility between LTE network 220 and other access networks with a S3 interface terminating at MME 232.

SGW 234 may include one or more devices that route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, etc.). In some implementations. SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PCRF 236 may include one or more computation and communication devices that provide policy control decision and flow based charging control functionalities. PCRF 236 may provide network control regarding service data flow detection, gating, QoS and flow based charging, etc. In some implementations, PCRF 236 may determine how a certain service data flow shall be treated, and may ensure that user plane traffic mapping and treatment is in accordance with a user's subscription profile.

PG-W 238 may include one or more devices that provide connectivity of UE 210 to external packet data networks by being a traffic exit/entry point for UE 210. UE 210 may simultaneously connect to more than one PGW 238 for accessing multiple PDNs 250. PGW 238 may perform policy enforcement, packet filtering for each user, charging support, lawful intercept, and packet screening. PGW 238 may also act as an anchor for mobility between 3GPP and non-3GPP technologies. In some implementations, PGW 238 may include one or more traffic transfer devices (or network devices), such as a gateway, a router, a switch, a firewall, a NIC, a hub, a bridge, a proxy server, an OADM, or some other type of device that processes and/or transfers traffic.

IMS network 240 may include an architectural framework or network (e.g., a telecommunications network) for delivering IP multimedia services. In some implementations, IMS network 240 may include a standardized reference architecture that provides session control, a connection control and an applications services framework, and user and services data.

HSS 242 may include one or more computation and communication devices that provide a master user database that supports devices of IMS network 240 that handle calls. HSS 242 may contain subscription-related information (e.g., user profiles), may perform authentication and authorization of a user, and may provide information about a user's location and IP information.

P-CSCF 244 may include one or more computation and communication devices that function as a proxy server for UE 210, where SIP signaling traffic to and from UE 210 may go through P-CSCF 244. In some implementations, P-CSCF 244 may validate and then forward requests from UE 210, and may process and forward responses to UE 210.

PDN 250 may include one or more data communications networks that are based on packet switching, as opposed to circuit switching that is used in public telephone networks. In some implementations, PDN 250 may be capable of communicating with UE 210 over IMS network 240.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 300.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for granting or denying access to exposed APIs. In some implementations, one or more process blocks of FIG. 4 may be performed by UE 210. In some implementations, one or more process blocks of FIG. 4 may be performed by another device or a group of devices separate from or including UE 210.

As shown in FIG. 4, process 400 may include exposing an IMS PDN API and a DRX cycle API to a PTT application (block 410). For example, UE 210 may include a PTT application that enables UE 210 to establish and conduct PTT sessions with other UEs 210. In some implementations, UE 210 may include an IMS PDN API that enables UE 210 to establish a data connection with PDN 250 over IMS network 240, as opposed to over the public Internet. For example, the IMS PDN API may enable the PTT application to make a data connection with PDN 250 over IMS network 240. In some implementations, UE 210 may include several hidden or unexposed APIs that may not be viewed or altered by applications provided in UE 210. However, the IMS PDN API may be exposed by UE 210 so that the PTT application may utilize the IMS PDN API to establish a data connection with PDN 250 over IMS network 240.

In some implementations, UE 210 may include a DRX cycle API that controls a DRX cycle timer associated with UE 210. The DRX cycle timer may include a timer that dictates when UE 210 checks a network for traffic (e.g., UE 210 may check a network for traffic after expiration of the DRX cycle timer). In some implementations, the DRX cycle API may be exposed by UE 210 so that the PTT application ma modify the DRX cycle timer. For example, UE 210 may decrease the DRX cycle timer so that UE 210 checks EPS 215 for traffic (e.g., PTT traffic) more frequently. This may enable UE 210 to more quickly receive PTT traffic from EPS 215.

As further shown in FIG. 4, process 400 may include receiving, by a security application, a credential from the PTT application (block 420). For example, UE 210 may include a security application that provides secure access to exposed APIs in UE 210. In some implementations, the security application may provide secure access to the IMS PDN API and the DRX cycle API by the PTT application. In some implementations, the security application may prevent unauthorized applications from accessing the IMS PDN API and the DRX cycle API.

For example, the security application may include authentication credentials (e.g., a certificate, a signature, an authentication key, a security token, etc.) that may be utilized to authenticate applications attempting to access the IMS PDN API and/or the DRX cycle API. The security application may request that a particular application attempting, to access the EMS PDN API and/or the DRX cycle API provide authentication credentials.

In some implementations, the PTT application may be installed in UE 210 by a manufacturer of UE 210, may be installed by a network service provider, or may be downloaded and installed in UE 210 by a user of UE 210. When the PTT application is installed in UE 210, the PTT application may be provided with authentication credentials (e.g., a signature), and may provide the authentication credentials to the security application. The security application may receive the authentication credentials (e.g., the signature).

As further shown in FIG. 4, process 400 may include determine whether the credential received from the PTT application matches a credential associated with the security application (block 430). For example, the security application may determine whether the authentication credentials received from the PTT application match the authentication credentials of the security application. In some implementations, the authentication credentials of the security application may include a first signature associated with a first certificate, a first private signing key, and/or a first public, verification key. The authentication credentials of the PTT application may include a second signature associated with a second certificate, a second private signing key, and/or a second public verification key. In such implementations, the security application may determine whether the first signature matches the second signature. For example, the security application may determine whether the first certificate matches the second certificate, whether the first private signing key matches the second private signing key, and/or whether the first public verification key matches the second public verification key.

As further shown in FIG. 4, if the credential received from the PTT application matches the credential associated with the security application (block 430—YES), process 400 may include authenticating the PTT application for accessing the IMS PDN API and the DRX cycle API (block 440). For example, if the authentication credentials provided by the PTT application match the authentication credentials of the security application, the security application may authenticate the PTT application for accessing the IMS PDN API and/or the DRX cycle API. In some implementations, when the PTT application is installed in UE 210, the PTT application may be provided with authentication credentials that match the authentication credentials of the security application. Therefore, the security application may authenticate the PTT application for accessing the IMS PDN API and/or the DRX cycle API.

When the PTT application is authenticated for access to the PDN API and the DRX cycle API, the PTT application may utilize anti/or modify the IMS PDN API and the DRX cycle API. In some implementations, the PTT application may utilize the IMS PDN API to establish a data connection (e.g., set up data mutes) with PDN 250 over IMS network 240. The PTT application may utilize the data connection over IMS network 240 to implement a QoS framework for PTT traffic associated with the PTT application.

In some implementations, when the PTT application is installed in UE 210 or when UE 210 receives a tracking area update (TAU) a TAU may be performed periodically or when UE 210 moves to another set of cells or tracking area) from EPS 215, the PTT application may access the DRX cycle API in order to modify the DRX cycle API. For example, the PTT application may modify the DRX cycle timer provided in the DRX cycle API. In some implementations, the PTT application may decrease the DRX cycle timer so that UE 210 checks EPS 215 for traffic e.g., PTT traffic) more frequently (e.g., every so many milliseconds, seconds, minutes, etc.). This may enable UE 210 to more quickly receive PTT traffic from EPS 215, such as an incoming PTT call, which may result in shorter call setup times (e.g., relative to public Internet-based PTT).

In some implementations, the PTT application may restore the DRX cycle timer to a configurable default value based on particular conditions. For example, the PTT application may restore the DRX cycle time to the default value when UE 210 is connected to an access network other than LTE network 220 (e.g., when LTE 210 connects to a wireless LAN (WLAN)). In such an example, the PTT application may modify the DRX cycle timer again when UE 210 reconnects to LTE network 220.

As further shown in FIG. 4, if the credential received from the PTT application does not match the credential associated with the security application (block 430—NO), process 400 may include not authenticating the PTT application for accessing the IMS PDN API and the DRX cycle API (block 440). For example, if the authentication credentials provided by the PTT application fail to match the authentication credentials of the security application, the security application may not authenticate the PTT application for accessing the IMS PDN API and/or the DRX cycle API and may generate an error (e.g., as security exception error). In some implementations, another application of UE 210 may maliciously or not maliciously attempt to access the IMS PDN API and/or the DRX cycle API. The other application may not be provided with a credential that matches the credential of the security application. Prior to attempting to access the IMS PDN API and/or the DRX cycle API, the other application may provide the non-matching, credential to the security application, and the security application may not authenticate the other application for accessing the IMS PDN API and/or the DRX cycle API.

In some implementations, the security application may notify the operating system of UE 210 of the result of the authentications. For example, the security application may inform the operating system that the PTT application is authenticated for accessing the IMS PDN API and the DRX cycle API. In another example, the security application may inform the operating system that the other application is not authenticated for accessing the IMS PDN API and the DRX cycle API.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
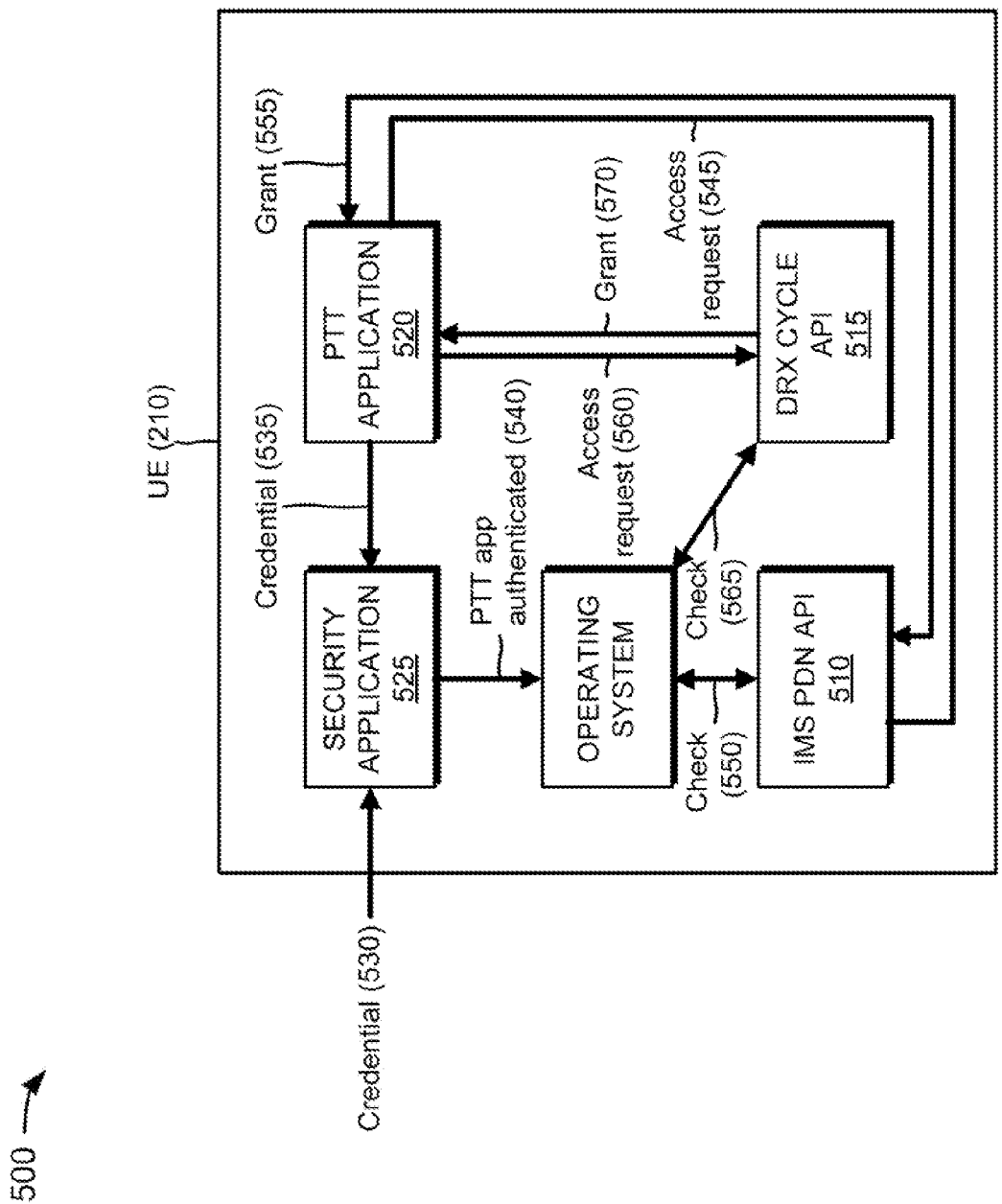
Figure 5C:
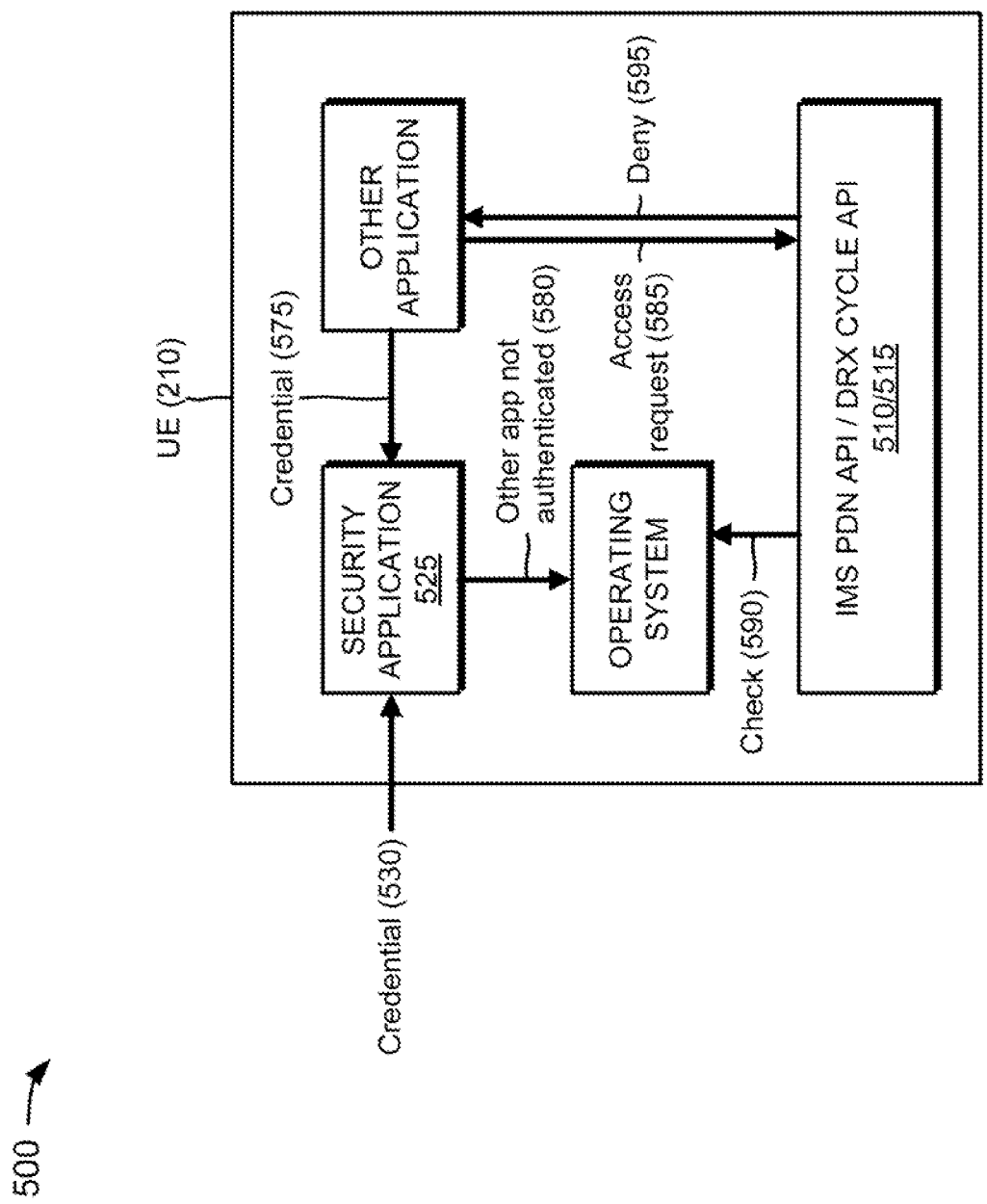

FIGS. 5A-5C are diagrams of an example 500 relating to example process 400 shown in FIG. 4, in example 500, assume that UE 210 includes unexposed APIs 505 that are hidden from a user of UE 210 and/or applications executing on UE 210, as shown in FIG. 5A. Unexposed APIs 505 may include an IMS PDN API 510 that enables UE 210 to establish a data connection with PDN 250 over IMS network 240, and a DRX cycle API 515 that controls a DRX cycle timer associated with UE 210. As further shown in FIG. 5A, IMS PDN API 510 and DRX cycle API 515 may be exposed to a PTT application 520 that enables UE 210 to establish and conduct PTT sessions with other UEs 210. IMS PDN API 510 and DRX cycle API 515 may be exposed to PTT application 520 so that PTT application 520 may utilize and/or modify IMS PDN API 510 and/or DRX cycle API 515.

As shown in FIG. 5B. UE 210 may include a security application 525 that determines whether an application is authenticated for accessing IMS PDN API 510 and/or DRX cycle API 515. Security application 525 may include as credential 530 that is utilized to authenticate applications attempting to access IMS PDN API 510 and/or DRX cycle API 515. As further shown in FIG. 5B, PTT application 520 may provide a credential 535 to security application 525. Assume that security application 525 determines that credential 535 provided by PTT application 520 matches credential 530 of security application 525. Accordingly, security application 525 may determine that PTT application 520 is authenticated for accessing IMS PDN API 510 and/or DRX cycle API 515, as indicated by reference number 540, and may provide this information to an operating system of UE 210.

As further shown in FIG. 5B, PTT application 520 may provide an access request 545 to IMS PDN API 510, and IMS PDN API 510 may check 550, based on access request 545, with the operating system to determine whether PTT application 520 is authenticated for accessing IMS PDN API 510. Since PTT application 520 is authenticated, PTT application 520 may be granted access to IMS PDN API 510, as indicated by reference number 555. PTT application 520 may provide an access request 560 to DRX cycle API 515, and DRX cycle API 515 may check 565, based on access request 560, with the operating system to determine whether PTT application 520 is authenticated for accessing DRX cycle API 515. Since PTT application 520 is authenticated, PTT application 520 may be granted access to DRX cycle API 515, as indicated by reference number 570.

As shown in FIG. 5C, another application of UE 210 may provide a credential 575 to security application 525. Assume that security application 525 determines that credential 575 provided by the other application does not match credential 530 of security application 525. Accordingly, security application 525 may determine that the other application is not authenticated for accessing IMS PDN API 510 and/or DRX cycle API 515, as indicated by reference number 580, and may provide this information to the operating system.

As further shown in FIG. 5C, the other application may provide an access request 585 to IMS PDN API 510 and/or DRX cycle API 515. IMS PDN API 510 and/or DRX cycle API 515 may check 590, based on access request 585, with the operating system to determine whether the other application is authenticated for accessing IMS PDN API 510 and/or DRX cycle API 515. Since the other application is not authenticated, the other application may be denied access to IMS PDN API 510 and/or DRX cycle API 515, as indicated by reference number 595.

As indicated above, FIGS. 5A-5C are provided merely as an example. Other examples are possible and may differ from what was described with regard to FIGS. 5A-5C.

FIG. 6 is a flow chart of an example process 600 for establishing and conducting a PTT session with another UE based on exposed APIs. In some implementations, one or more process blocks of FIG. 6 may be performed by UE 210. In some implementations, one or more process blocks of FIG. 6 may be performed by another device or a group of devices separate from or including UE 210.

As shown in FIG. 6, process 600 may include modifying a DRX cycle timer with a PTT application and via a DRX cycle API (block 610). For example, the PTT application of UE 210 may access the DRX cycle API, and may modify the DRX cycle timer provided in the DRX cycle API. In some implementations, the security application may provide secure access to the DRX cycle API by the PTT application. In some implementations, the PTT application may decrease the DRX cycle timer so that UE 210 checks EPS 215 for traffic (e.g., PTT traffic) more frequently. This may enable UE 210 to more quickly receive PTT traffic from EPS 215, such as an incoming PTT call, which may result in shorter call setup times (e.g., relative public Internet-based PTT).

As further shown in FIG. 6, process 600 may include establishing, via an IMS PDN API and the PTT application, data routes with a network (block 620). For example, the PTT application of UE 210 may access the IMS PDN API, and may utilize the IMS PDN API. In some implementations, the security application may provide secure access to the IMS PDN API by the PTT application. In some implementations, the PTT application may utilize the IMS PDN API to establish a data connection e.g., set up data routes) with PDN 250 over IMS network 240. Unlike the public Internet, IMS network 240 may permit UE 210 to utilize QoS with respect to PTT sessions. The QoS may improve a call setup time for establishing a PTT session, and may improve a latency time associated with the PTT session.

As further shown in FIG. 6, process 600 may include establishing a QoS framework with the network for prioritizing PTT traffic (block 630). For example, UE 210 may connect to PDN 250 over IMS network 240 and via LTE network 220 and EPC network 230. In some implementations, the PTT application of UE 210 may establish a QoS framework with EPS 215 (e.g., with IMS network 240) that prioritizes PTT traffic associated with the PTT application. For example, the PTT application may prioritize PTT traffic over best effort traffic (e.g., email traffic, video traffic, Internet traffic, etc.), as the PTT traffic traverses IMS network 240 and PDN 250.

In some implementations, since the IMS PDN API may permit the PTT application to establish a data connection with PDN 250 over IMS network 240, the PTT application may utilize the data connection over IMS network 240 to implement a QoS framework for PTT traffic associated with the PTT application. In some implementations, QoS bearers may be defined in IMS network 240 and may be set up statically when UE 210 registers with IMS network 240. In some implementations, the QoS bearers may be set up dynamically when UE 210 utilizes the PTT application to make a PTT call.

In some, implementations, the PTT traffic may be prioritized after guaranteed bit rate (GBR) conversational audio (e.g. voiceoverIP (VoIP) traffic); before non-GBR variable bit rate video traffic; before non-GBR standard video telephony, video streaming, and general best effort traffic; and before non-GBR machine-to-machine (M2M) traffic. By prioritizing the PTT traffic over the non-GBR traffic, the PTT application ma reduce latency times associated with PTT sessions.

As further shown in FIG. 6, process 600 may include utilizing the PTT application and the modified cycle timer to establish a PTT session with a UE (block 640). For example, UE 210 may utilize the modified DRX cycle timer to check EPS 215 for traffic, such as a PTT call from another UE 210. When UE 210 receives the PTT call from the other UE 210, and UE 210 may execute the PTT application based on receiving the PTT call. Based on the PTT call, the PTT application may display information indicating that the other UE 210 is trying, to establish a PTT session with UE 210. If the user accepts the PTT call, a PTT session may be established between UE 210 and the other UE 210. If the user does not accept the PTT call, a PTT session may not be established between UE 210 and the other UE 210.

In some implementations, the user may instruct UE 210 to execute the PTT application, and the user may utilize the PTT application to establish a PTT session with the other UE 210. In some implementations, the PTT application may display a list of available PTT contacts associated with the user, and the user may select a PTT contact associated with the other UE 210 from the list. When the user selects the PTT contact, the PTT application may cause UE 210 to generate a PTT call destined for the other UE 210. In some implementations, UE 210 may provide the PTT call to the other UE 210 via EPS 215. If the PTT contact accepts the PTT call, a PTT session may be established between UE 210 and the other UE 210. If the PTT contact does not accept the PTT call, a PTT session may not be established between UE 210 and the other UE 210.

As further shown in FIG. 6, process 600 may include prioritizing the PTT traffic during the PTT session based on the QoS framework (block 650). For example, during the PTT session, UE 210 may prioritize the PTT traffic over best effort traffic based on the QoS framework established with EPS 215, in some implementations, during the PTT session, the other UE 210 may also prioritize the PTT traffic over any best effort traffic associated with the other UE 210, based on the QoS framework established with EPS 215. In some implementations, the PTT traffic, in the PTT session with the other UE 210, may be prioritized before non-GBR traffic, such as, for example, variable bit rate video traffic, standard video telephony traffic, video streaming traffic, general best effort traffic, and M2M traffic. By prioritizing the PTT traffic over the non-GBR traffic, the PTT application may reduce latency times associated with PTT session with the other UE 210.

In some implementations, the combination of the reduced DRX cycle timer, the QoS framework for PTT traffic, and other enhancements (e.g., frame bundling of PTT traffic) may provide improved PTT call setup time and/or latency time over current 4G PTT implementations, which may improve the PTT user experience for the users of UE 210 and the other UE 210. For example, the combination may enable the user of UE 210 to experience push to hear delays of approximately less than one second during the PTT session with the other UE 210. In some implementations, the combination may enable the user of the other UE 210 to experience push to hear delays of approximately less than one second during the PTT session with UE 210.

As further shown in FIG. 6, process 600 may include determining whether the PTT application is uninstalled (block 660). For example, the security application may determine whether the PTT application is uninstalled (or removed) from UE 210. In some implementations, the user of UE 210 may utilize an uninstall function of UE 210 to request that the PTT application be uninstalled. The uninstall function, when implemented by the user, may perform operations to uninstall the PTT application from UE 210. In some implementations, the operating system of UE 210 may notify the security application about any applications that are uninstalled from UE 210, including, the PTT application.

As further shown in FIG. 6, if the PTT application is not uninstalled (block 660—NO), process 600 may include ending the PTT session with the UE (block 670). For example, if the security application determines that the PTT application is not uninstalled, UE 210 may continue to use the PTT application. In some implementations, the user of UE 210 may eventually end the PTT session with the other UE 210 by selecting a mechanism (e.g., an end call button, icon, link, etc.) displayed by the PTT application during the PTT session. In some implementations, when the user of UE 210 selects the end call mechanism, UE 210 may terminate the PTT session with the other UE 210, and may display information associated with the PTT application to the user. In some implementations, UE 210 may display other information (e.g., data associated with best effort traffic, a home page, etc.) to the user when the PTT session is terminated. In some implementations, the user of the other UE 210 may end the PTT session with UE 210.

As further shown in FIG. 6, if the PTT application is uninstalled (block 660 YES), process 600 may include utilizing the IMS PDN API to remove the data routes with the network (block 680). For example, if the security application determines that the PTT application is uninstalled from UE 210, or if the PTT application is turned off or disabled (e.g., by the user), the security application may utilize the IMS PDN API to remove any data routes set up by the PTT application via the IMS PDN API. In some implementations, the security application may utilize the IMS PDN API to remove any data connections (e.g., data routes) established with PDN 250 over IMS network 240. In some implementations, if the PTT application is turned on or enabled (e.g., by the user), the PTT application may utilize the IMS PDN API to establish another data connection (e.g., set up data routes) with PDN 250 over IMS network 240.

As further shown in FIG. 6, if the PTT application is uninstalled (block 660—YES), process 600 may include utilizing the DRX cycle API to reset the DRX cycle timer to a default value (block 690). For example, if the security application determines that the PTT application is uninstalled from UE 210, the security application may utilize the DRX cycle API to reset the DRX cycle timer to a default value. In some implementations, the security application may reset the DRX cycle timer to a configurable default value that may reduce battery usage in UE 210. For example, the default value of the DRX cycle timer may include a value that causes UE 210 to check EPS 215 for traffic less frequently, which may conserve battery usage in UE 210.

In some implementations, if the PTT application is removed or uninstalled from UE 210, or if the PTT application is turned off or disabled e.g., by the user), the security application may reset the DRX cycle timer to a configurable default value that may reduce battery usage in LIE 210. For example, the default value of the DRX cycle timer may include a value that causes UE 210 to check EPS 215 for traffic less frequently, which may conserve battery usage in UE 210. In some implementations, the security application may read a default DRX value that is being broadcasted by EPS 215, and may use the default DRX value to change the DRX cycle timer of UE 210 to the default value. This may reset the DRX cycle timer of UE 210 to a default value which EPS 215 wants devices to use (e.g. when using the default value). In some implementations, if the PTT application is turned on or enabled (e.g., by the user), the PTT application may decrease the DRX cycle timer so that UE 210 checks EPS 215 for traffic e.g., PTT traffic) more frequently (e.g., every so many milliseconds, seconds, minutes, etc).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
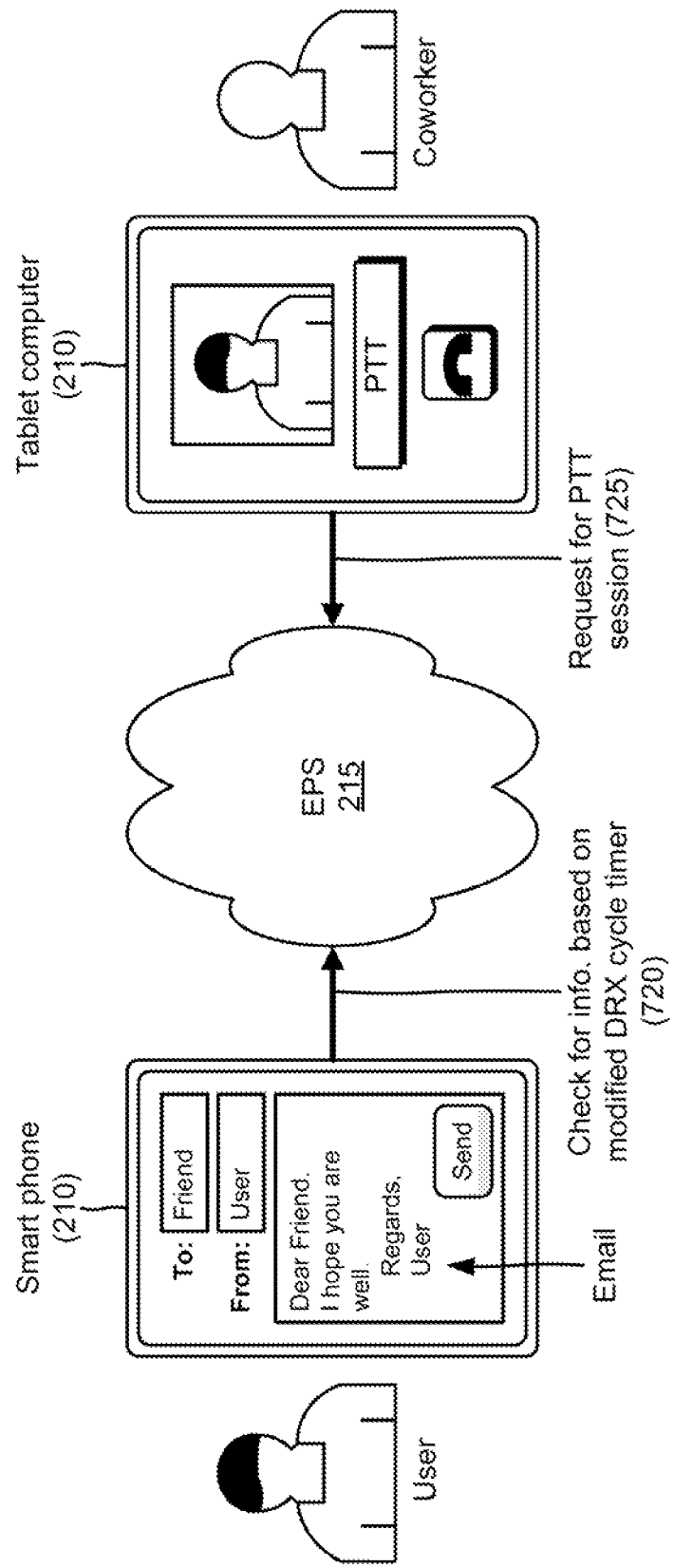
Figure 7C:
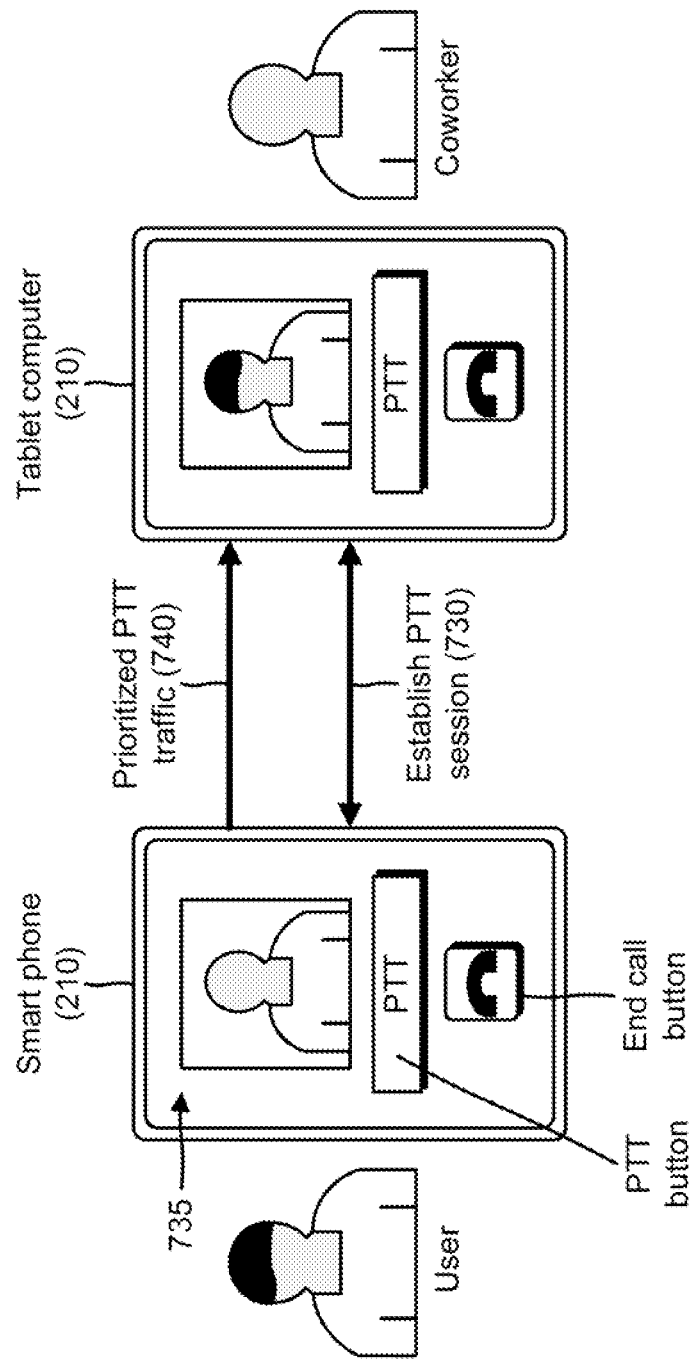
Figure 7F:
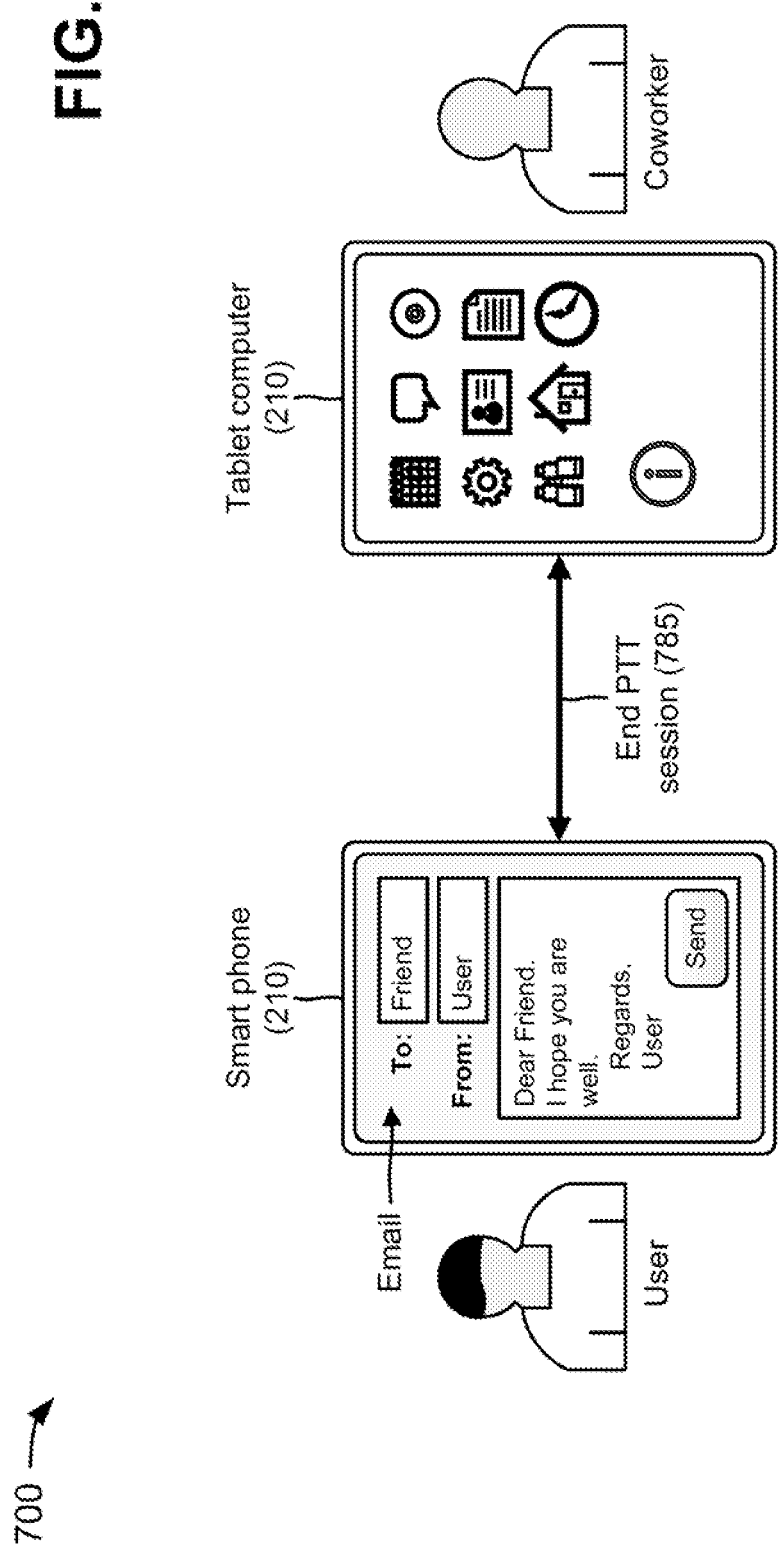

FIGS. 7A-7H are diagrams of an example 700 relating to example process 600 shown in FIG. 6. As shown in FIG. 7A, assume that a user is associated with UE. 210 (e.g., smart phone 210), and that smart phone 210 includes IMS PDN API 510, DRX cycle API 515, and PTT application 520. As further shown in FIG. 7A, PTT application 520 may access DRX cycle API 515, and may instruct DRX cycle API 515 to modify the DRX cycle timer. DRX cycle API 515 may modify the DRX cycle timer based the instruction, and UE 210 may utilize modified DRX cycle timer 705 to check EPS 215 for traffic. Assume that modified DRX cycle timer 705 causes smart phone 210 to check EPS 215 for information more frequently than before the DRX cycle timer was modified. PTT application 520 may access IMS PDN API 510, and may instruct IMS PDN API 510 to establish data routes in EPS 215, IMS PDN API 510 may establish data routes with IMS network 240 and PDN 250 based on the instruction, as indicated by reference number 710. As further shown in FIG. 7A, PTT application 520 may determine, with EPS 215, a QoS framework 715 that prioritizes PTT traffic.

As shown in FIG. 7B, while the user is creating an email message, smart phone 210 may check EPS 215 for information (e.g., received calls, traffic, etc.) based on a modified DRX cycle timer 705, as indicated by reference number 720. As further shown in 78, a coworker of the user may be associated with a tablet computer 210, and may utilize tablet computer 210 to access a PTT application provided in tablet computer 210. Assume that the coworker utilizes the PTT application to generate a request 725 for a PTT session with the user and smart phone 210. Tablet computer 210 may provide request 725 for the PTT session to EPS 215, and EPS 215 may forward request 725 toward smart phone 210 utilizing the QoS framework.

When request 725 is received by smart phone 210, smart phone 210 may execute a PTT application provided in smart phone 210 and may stop displaying email message 715. The PTT application may cause smart phone 210 to display information associated with request 725, such as the coworker's name, the coworker's picture, a mechanism to accept or deny request 725, etc. Assume that the user utilizes the displayed information to accept request 725, and establish a PTT session with tablet computer 210 and the coworker, as indicated by reference number 730 in FIG. 7C. When the PTT session is established, the PTT application may cause smart phone 210 to display a user interface 735 that includes a picture of coworker, a PTT button, and an end call button. As further shown in FIG. 7C, the PTT application of smart phone 210 may prioritize PTT traffic associated with the PTT session, as indicated by reference number 740.

As shown in FIG. 7D, assume that the user selects 745 the PTT button and begins talking to smart phone 210, as indicated by reference number 750. The user's spoken voice may be provided by smart phone 210 to tablet computer 210 (e.g., via EPS 215), and may be heard by the coworker via tablet computer 210, as indicated by reference number 755. As further shown in FIG. 7D, a delay time between when the user speaks and when the coworker hears the user's voice may be approximately less than one second, as indicated by reference number 760.

As shown in FIG. 7E, assume that the coworker selects 765 the PTT button and begins talking to tablet computer 210, as indicated by reference number 770. The coworker's spoken voice may be provided by tablet computer 210 to smart phone 210 (e.g., via EPS 215), and may be heard by the user via smart phone 210, as indicated by reference number 775. As further shown in FIG. 7E, a delay time between when the coworker speaks and when the user hears the coworker's voice may be approximately less than one second, as indicated by reference number 780.

Either the user or the coworker may end the PTT session by selecting the end call button. When the end call button is selected, smart phone 210 and tablet computer 210 may end the PTT session, as indicated by reference number 785 in FIG. 7F. As further shown, after the PTT session ends, smart phone 210 may resume displaying email message 715 to the user, and tablet computer 210 may display a home page or some other information to the coworker.

Figure 7G:
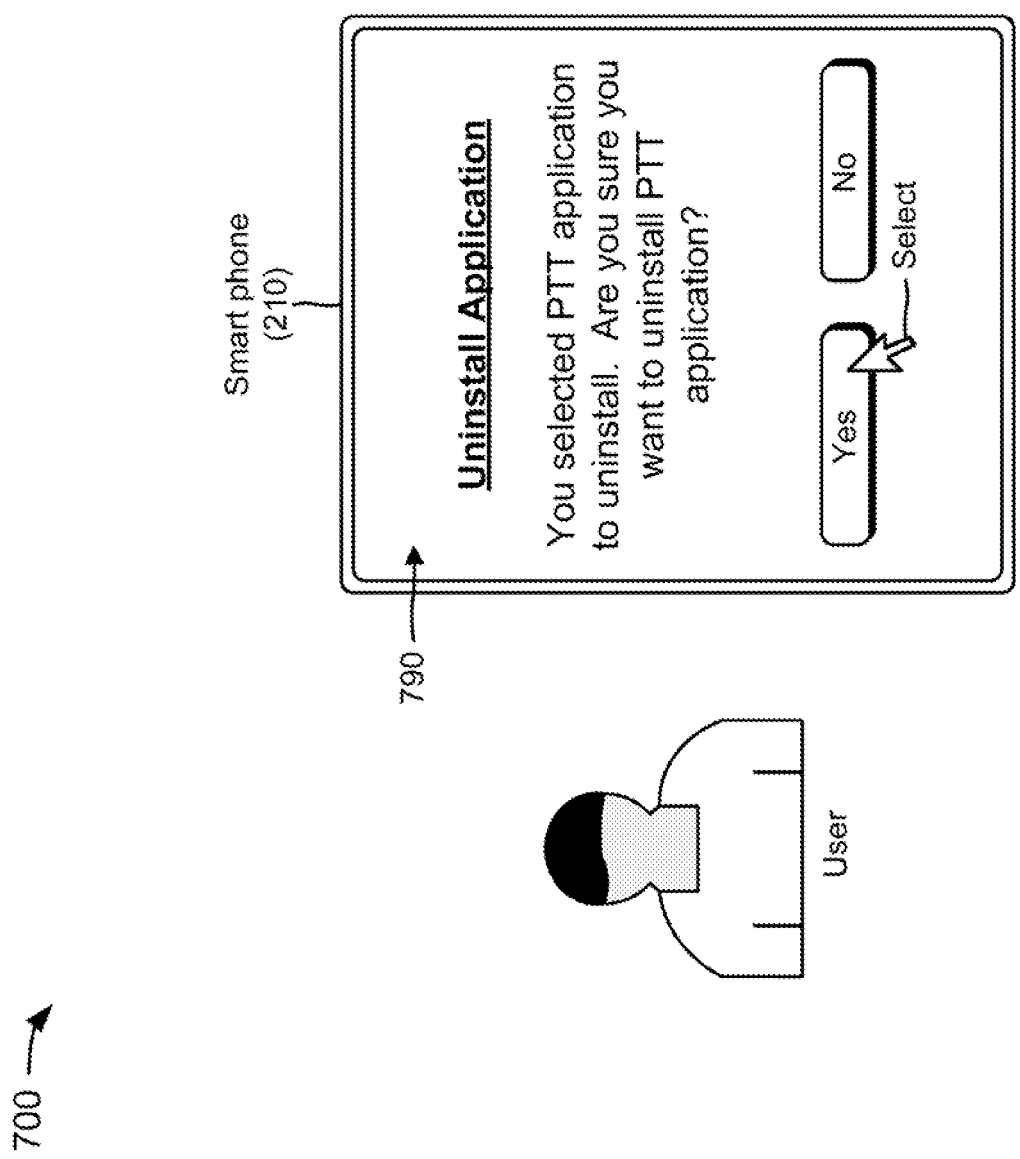

Now assume that the user utilizes an uninstall function of smart phone 210 to request that PTT application 520 be uninstalled from smart phone 210. When the uninstall function is invoked, smart phone 210 may display a user interface 590 to the user, as shown in FIG. 7G. User interface 790 may ask whether the user wants to uninstall PTT application 520. Assume that the user selects a Yes button of user interface 590 to indicate that the user wants to uninstall PTT application 520. When the user selects the Yes button, smart phone 210 may uninstall PTT application 520 from smart phone 210.

After smart phone 210 unistalls PTT application 520, security application 525 may receive (e.g., from the operating system of smart phone 210) a notification indicating that PTT application 520 has been uninstalled from smart phone 210. Based on the notification, security application 525 may instruct DRX cycle API 515 to reset the DRX cycle timer, as indicated by reference number 795 in FIG. 7H, and DRX cycle API 514 may reset the DRX cycle timer to a default value. Based on the notification, security application 525 may instruct IMS PDN API 510 to remove data routes established in EPS 215, as indicated by reference number 797 in FIG. 7H, and IMS PDN API 510 may remove any data routes established with IMS network 240 and PDN 250.

As indicated above, FIGS. 7A-7H are provided merely as an example. Other examples are possible and may differ from what was described with regard to FIGS. 7A-7H.

To the extent the aforementioned implementations collect, store, or employ personal information provided by individuals, it should be understood that such information shall be used in accordance with all applicable laws concerning, protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in man different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based at least in part, on" unless explicitly stated otherwise.

What is claimed is:

1. A method, comprising:
   decreasing, with a device via a first application programming interface (API), a timer, associated with the device, from a first value to a second value,
   the device having a push to talk (PTT) application that is authenticated to access the first API,
   the timer establishing when the device checks for traffic received from a network,
   the first value of the timer causing the device to check for traffic received from the network at a first frequency,
   the second value of the timer causing the device to check for traffic received from the network at a second frequency, and
   the second frequency being greater than the first frequency;
   establishing, by the device and via a second API, a data connection with the network;
   determining, by the device and based on the data connection, a quality of service (QoS) framework for the network,
   the QoS framework assigning priorities to different types of traffic associated with the device;
   utilizing, by the device, the PTT application and the timer to establish a PTT session with another device via the network; and
   prioritizing, by the device and based on the QoS framework, PTT traffic provided in the PTT session with the other device.

2. The method claim 1, where authenticating the PTT application comprises:
   determining whether an authentication credential, associated with the PTT application, matches another authentication credential associated with a security application of the device; and
   selectively
   authenticating the PTT application to access the first API and the second API when the authentication credential, associated the PTT application, matches the other authentication credential associated with the security application; or
   failing to authenticate the PTT application to access the first API and the second API when the authentication credential, associated the PTT application, fails to match the authentication credential associated with the security application.

3. The method of claim 1, further comprising:
   accessing the first API with the PTT application; and
   where modifying the timer comprises:
   utilizing the PTT application to instruct the first API to modify the timer.

4. The method of claim 1, further comprising:
   accessing the second API with the PTT application; and
   where establishing the data connection with the network comprises:
   utilizing the PTT application to instruct the second API to establish the data connection with the network.

5. The method of claim 1, further comprising:
   determining that the PTT application is removed from the device;

restoring, via the first API, the timer to a default value when the PTT application is removed from the device; and removing, via the second API, the data connection with the network when the PTT application is removed from the device.

6. The method of claim 5, where the default value for the timer is broadcast by the network.

7. The method of claim 1, where the network includes an Internet protocol (IP) multimedia subsystem (IMS) network and a packet data network (PDN), and the method further comprises:

accessing the second API with the PTT application; and utilizing the second API to establish the data connection with the IMS network and the PDN.

8. A device, comprising:

a memory to store a push-to-talk (PTT) application; and one or more processors to:

modify, via a first application programming interface (API), a timer associated with the device, the device having a push to talk (PTT) application that is authenticated to access the first API, the timer establishing when the device checks for traffic received from a network, establish, via a second API of the PTT application that is authenticated to access the second API, a data connection with the network, determine, based on the data connection, a quality of service (QoS) framework for the network, the QoS framework assigning priorities to different types of traffic associated with the device, utilize the PTT application and the timer to establish a PTT session with another device via the network, prioritize, based on the QoS framework, PTT traffic provided in the PTT session with the other device, utilize the PTT application to terminate the PTT session with the other device, determine that the PTT application is removed from the device, restore, via the first API, the timer to a default value when the PTT application is removed from the device, and terminate, via the second API, the data connection with the network when the PTT application is removed from the device.

9. The device of claim 8, where, when authenticating the PTT application, the one or more processors are to:

determine whether a credential associated with the PTT application matches another credential associated with a security application of the device, and authenticate the PTT application to access the first API and the second API when the credential associated the PTT application matches the other credential associated with the security application.

10. The device of claim 8, where the one or more processors are further to:

access the first API with the PTT application, and where, when modifying the timer, the one or more processors are to:

utilize the PTT application to instruct the first API to modify the timer.

11. The device of claim 8, where the one or more processors are further to:

access the second API with the PTT application, and where, when establishing the data connection with the network, the one or more processors are to:

utilize the PTT application to instruct the second API to establish the data connection with the network.

12. The device of claim 8, where the network includes an Internet protocol (IP) multimedia subsystem (IMS) network and a packet data network (PDN), and the one or more processors are further to:

access the second API with the PTT application, and utilize the second API to establish the data connection with the IMS network and the PDN.

13. The device of claim 8, where, when modifying the timer, the one or more processors are further to:

decrease the timer from a first value to a second value, the first value of the timer causing the device to check for traffic received from the network at a first frequency, the second value of the timer causing the device to check for traffic received from the network at a second frequency, and the second frequency being greater than the first frequency.

14. The device of claim 8, where the default value for the timer is broadcast by the network.

15. A non-transitory computer-readable medium for storing instructions, the instructions comprising:

one or more instructions that, when executed by one or more processors of a device, cause the one or more processors to:

cause a security application to:

modify, via a first application programming interface (API) a timer associated with the device, the device having a push to talk (PTT) application that is authenticated to access the first API, the timer establishing when the device checks for traffic received from a network, establish, via a second API when the PTT application is permitted to access the second API, a data connection with the network, determine, based on the data connection, a quality of service (QoS) framework for the network, the QoS framework assigning priorities to different types of traffic associated with the device, utilize the timer to establish a PTT session with another device via the network, prioritize, based on the QoS framework, PTT traffic provided in the PTT session with the other device, determine that the PTT application is uninstalled from the device, restore, via the first API, the timer to a default value when the PTT application is uninstalled from the device, and terminate, via the second API, the data connection with the network when the PTT application is uninstalled from the device.

16. The computer-readable medium of claim 15, where the instructions further comprise:

one or more instructions that, when executed by the one or more processors, cause the one or more processors to:

cause the security application to:

determine whether a credential associated with the PTT application matches another credential associated with the security application, and authenticate the PTT application to access the first API and second API when the credential associated the PTT application matches the other credential associated with the security application.

17. The computer-readable medium of claim 15, where, when modifying the timer, the instructions further comprise:
  one or more instructions that, when executed by the one or more processors, cause the one or more processors to:
    cause the PTT application to:
      access the first API, and
      instruct the first API to modify the timer.

18. The computer-readable medium of claim 15, where, when establishing the data connection with the network, the instructions further comprise:
  one or more instructions that, when executed by the one or more processors, cause the one or more processors to:
    cause the PTT application to:
      access the second API, and
      instruct the second API to establish the data connection with the network.

19. The computer-readable medium of claim 15, where the network includes an Internet protocol (IP) multimedia subsystem (IMS) network and a packet data network (PDN), and the instructions further comprise:
  one or more instructions that, when executed by the one or more processors, cause the one or more processors to:
    cause the PTT application to:
      access the second API, and
      instruct the second API to establish the data connection with the IMS network and the PDN.

20. The computer-readable medium of claim 15, where the default value for the timer is broadcast by the network.

* * * * *